United States Patent
Awasthi et al.

(10) Patent No.: US 9,309,357 B2
(45) Date of Patent: Apr. 12, 2016

(54) SYNTHESIS OF FREE RADICAL POLYMERIZABLE ETHYLENICALLY UNSATURATED POLOXAMERS AND POLOXAMINES

(71) Applicant: Bausch & Lomb Incorporated, Rochester, NY (US)

(72) Inventors: Alok Kumar Awasthi, Pittsford, NY (US); Jay F. Kunzler, Canandaigua, NY (US); Ganugapati Satyanarayana, Karnataka (IN); Satheesha Rai Nooji, Karnataka (IN)

(73) Assignee: Bausch & Lomb Incorporated, Rochester, NY (US)

(*) Notice: Subject to any disclaimer, the term of this patent is extended or adjusted under 35 U.S.C. 154(b) by 0 days.

(21) Appl. No.: 14/308,229

(22) Filed: Jun. 18, 2014

(65) Prior Publication Data

US 2014/0371481 A1   Dec. 18, 2014

Related U.S. Application Data

(60) Provisional application No. 61/836,471, filed on Jun. 18, 2013.

(51) Int. Cl.
| | | |
|---|---|---|
| *A01N 31/02* | (2006.01) |
| *C08G 65/48* | (2006.01) |
| *C08F 290/06* | (2006.01) |
| *C08F 222/10* | (2006.01) |

(52) U.S. Cl.
CPC .......... *C08G 65/48* (2013.01); *C08F 222/1006* (2013.01); *C08F 290/062* (2013.01)

(58) Field of Classification Search
CPC ...................................................... A01N 31/02

USPC ......................................................... 560/180
See application file for complete search history.

(56) References Cited

U.S. PATENT DOCUMENTS

| 6,517,933 B1 | 2/2003 | Soane et al. |
| 8,377,464 B2 | 2/2013 | Linhardt et al. |
| 2003/0044468 A1 | 3/2003 | Cellesi et al. |
| 2009/0318583 A1 | 12/2009 | Zhang et al. |

FOREIGN PATENT DOCUMENTS

| WO | 00/07603 A2 | 2/2000 |
| WO | WO 2009073374 A2 * | 6/2009 |

OTHER PUBLICATIONS

Cutié: The Effects of MEHQ on the Polymerization of Acrylic Acid in the Preparation of Superabsorbent Gel Accepted Oct. 1, 1996 (13 pages).
International Search Report and Written Opinion of the International Searching Authority in corresponding International Application No. PCT/US2014/042951, mailed Nov. 3, 2014 (8 pages).

* cited by examiner

*Primary Examiner* — Kamal Saeed
*Assistant Examiner* — Janet L Coppins
(74) *Attorney, Agent, or Firm* — Toan P. Vo

(57) ABSTRACT

A new synthetic method of forming free radical polymerizable end terminal functionalized poloxamers and poloxamines in commercial scale batches which uses a binary system of inhibitors to eliminate the formation of high molecular weight impurities. It has also been surprisingly discovered that the inorganic impurities formed during the commercial scale synthetic process are removed by the use of resin materials.

20 Claims, 43 Drawing Sheets

Syngene International Ltd

C:\LabSolutions\Data\Y2012\OCT2012\POLOXAMER\STD-1.lcd

| | | | |
|---|---|---|---|
| Sample Name | :STANDARD | Injection Volume : 100μL | |
| Sample ID | :STD-1 | Tray# : 1 | |
| Data File Name | :STD-1.lcd | Vial# : 3 | |
| Method File Name | :C:\LabSolutions\Methods\POLOXAMER.lcm | | |
| Data Acquired | :13Oct12 1:09:39 PM | | |

Method information : SHODEX KB-804(300 x 8)mm
　　　　　　　　　Mobile Phase D: SODIUM ACETATE BUFFER
　　　　　　　　　Flow : 0.7ml/min
　　　　　　　　　Column oven : 35°C
　　　INJECTION VOLUME: 100μl
　　　　　RUN TIME　　　: 25min

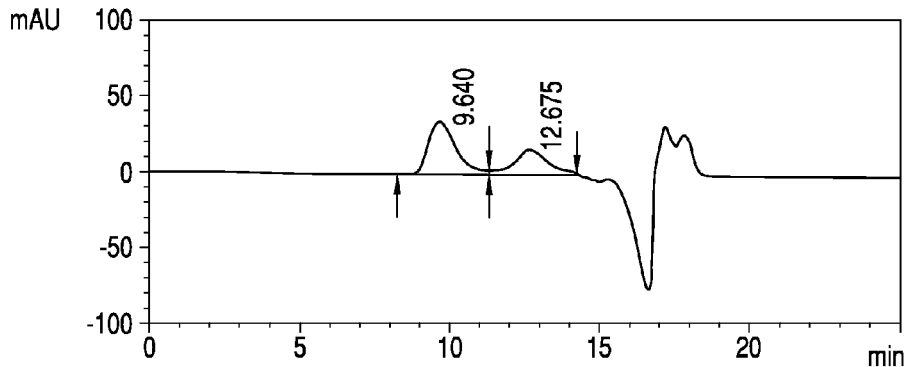

1 PDA Multi 1/230nm 4nm　　　　Peak Table

PDA Ch1 230nm 4nm

| Peak# | Ret. Time | Area | Area% |
|---|---|---|---|
| 1 | 9.640 | 2226408 | 62.620 |
| 2 | 12.675 | 1329009 | 37.380 |
| Total | | 3555417 | 100.000 |

FIG. 2

Syngene International Ltd

C:\LabSolutions\Data\Y2012\OCT2012\POLOXAMER\STD-2.lcd

| | | |
|---|---|---|
| Sample Name | :STANDARD | Injection Volume : 100μL |
| Sample ID | :STD-2 | Tray# : 1 |
| Data File Name | :STD-2.lcd | Vial# : 3 |
| Method File Name | :C:\LabSolutions\Methods\POLOXAMER.lcm | |
| Data Acquired | :13Oct12 1:35:16 PM | |

Method information : SHODEX KB-804(300 x 8)mm
                         Mobile Phase D: SODIUM ACETATE BUFFER
                         Flow : 0.7ml/min
                         Column oven : 35°C
                 INJECTION VOLUME: 100μl
                 RUN TIME      : 25min

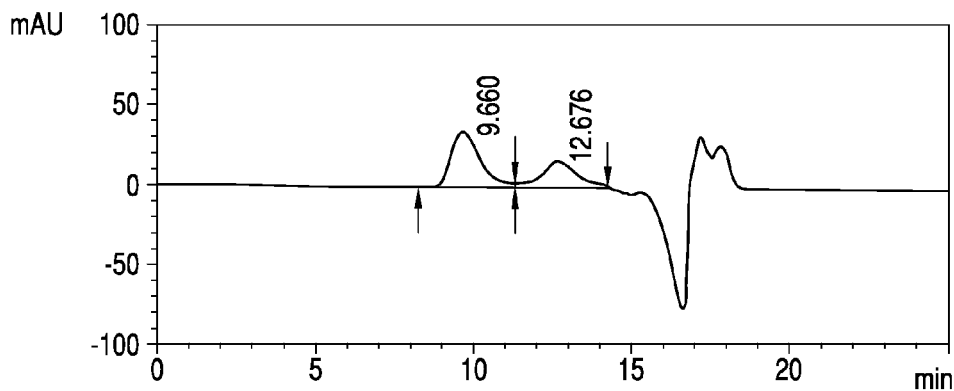

1 PDA Multi 1/230nm 4nm          Peak Table

PDA Ch1 230nm 4nm

| Peak# | Ret. Time | Area | Area% |
|---|---|---|---|
| 1 | 9.660 | 2329288 | 62.597 |
| 2 | 12.676 | 1391799 | 37.403 |
| Total | | 3721087 | 100.000 |

FIG. 3

Syngene International Ltd

C:\LabSolutions\Data\Y2012\OCT2012\POLOXAMER\STD-3.lcd

| | | | |
|---|---|---|---|
| Sample Name | :STANDARD | Injection Volume : 100μL | |
| Sample ID | :STD-3 | Tray# : 1 | |
| Data File Name | :STD-3.lcd | Vial# : 3 | |
| Method File Name | :C:\LabSolutions\Methods\POLOXAMER.lcm | | |
| Data Acquired | :13Oct12 2:00:53 PM | | |

Method information : SHODEX KB-804(300 x 8)mm
                            Mobile Phase D: SODIUM ACETATE BUFFER
                            Flow : 0.7ml/min
                            Column oven : 35°C
            INJECTION VOLUME: 100μl
            RUN TIME     : 25min

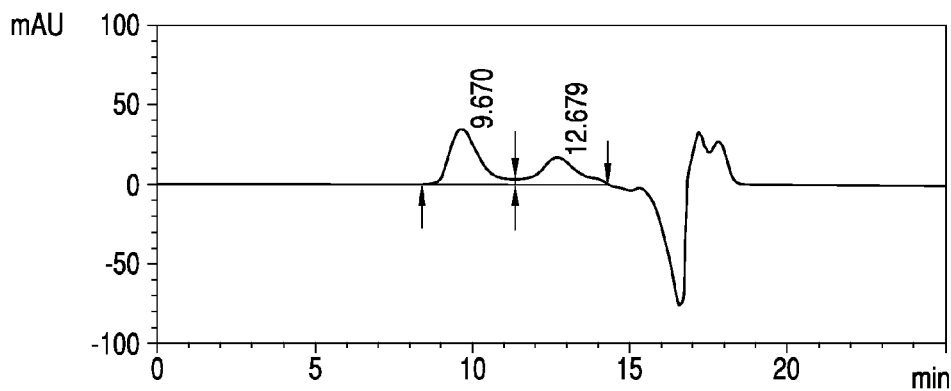

1 PDA Multi 1/230nm 4nm        Peak Table

PDA Ch1 230nm 4nm

| Peak# | Ret. Time | Area | Area% |
|---|---|---|---|
| 1 | 9.670 | 2329679 | 61.719 |
| 2 | 12.679 | 1444988 | 38.281 |
| Total | | 3774667 | 100.000 |

FIG. 4

Syngene International Ltd

C:\LabSolutions\Data\Y2012\OCT2012\POLOXAMER\STD-4.lcd

| | | |
|---|---|---|
| Sample Name | :STANDARD | Injection Volume : 100μL |
| Sample ID | :STD-4 | Tray# : 1 |
| Data File Name | :STD-4.lcd | Vial# : 3 |
| Method File Name | :C:\LabSolutions\Methods\POLOXAMER.lcm | |
| Data Acquired | :13Oct12 2:26:31 PM | |

Method information : SHODEX KB-804(300 x 8)mm
                          Mobile Phase D: SODIUM ACETATE BUFFER
                          Flow : 0.7ml/min
                          Column oven : 35°C
             INJECTION VOLUME: 100μl
             RUN TIME      : 25min

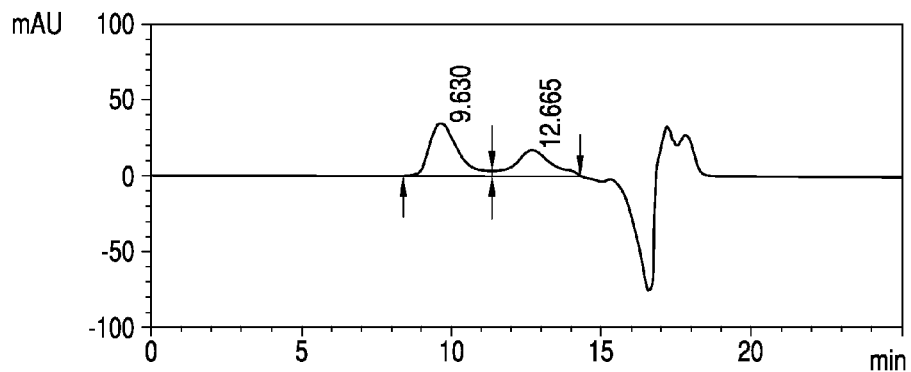

1 PDA Multi 1/230nm 4nm        Peak Table

PDA Ch1 230nm 4nm

| Peak# | Ret. Time | Area | Area% |
|---|---|---|---|
| 1 | 9.630 | 2315375 | 61.207 |
| 2 | 12.665 | 1467507 | 38.793 |
| Total | | 3782881 | 100.000 |

FIG. 5

Syngene International Ltd

C:\LabSolutions\Data\Y2012\OCT2012\POLOXAMER\STD-5.lcd

Sample Name :STANDARD  Injection Volume : 100μL
Sample ID :STD-5  Tray# : 1
Data File Name :STD-5.lcd  Vial# : 3
Method File Name :C:\LabSolutions\Methods\POLOXAMER.lcm
Data Acquired :13Oct12 2:52:09 PM Method information : SHODEX KB-804(300 x 8)mm
　　　　　　　　　 Mobile Phase D: SODIUM ACETATE BUFFER
　　　　　　　　　 Flow : 0.7ml/min
　　　　　　　　　 Column oven : 35°C
　　　　　　INJECTION VOLUME: 100μl
　　　　　　　　RUN TIME : 25min

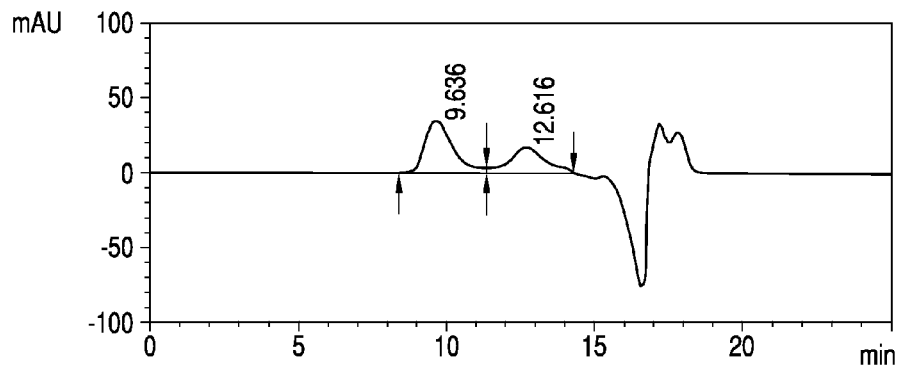

1 PDA Multi 1/230nm 4nm    Peak Table

PDA Ch1 230nm 4nm

| Peak# | Ret. Time | Area | Area% |
|---|---|---|---|
| 1 | 9.636 | 2286721 | 62.685 |
| 2 | 12.616 | 1361211 | 37.315 |
| Total | | 3647932 | 100.000 |

FIG. 6

Syngene International Ltd

C:\LabSolutions\Data\Y2012\OCT2012\POLOXAMER\STD-6.lcd

Sample Name        :STANDARD                               Injection Volume : 100μL
Sample ID          :STD-6                                  Tray# : 1
Data File Name     :STD-6.lcd                              Vial#    : 3
Method File Name   :C:\LabSolutions\Methods\POLOXAMER.lcm
Data Acquired      :13Oct12 3:17:46 PM Method information : SHODEX KB-804(300 x 8)mm
                     Mobile Phase D: SODIUM ACETATE BUFFER
                     Flow : 0.7ml/min
                     Column oven : 35°C
              INJECTION VOLUME: 100μl
                     RUN TIME     : 25min

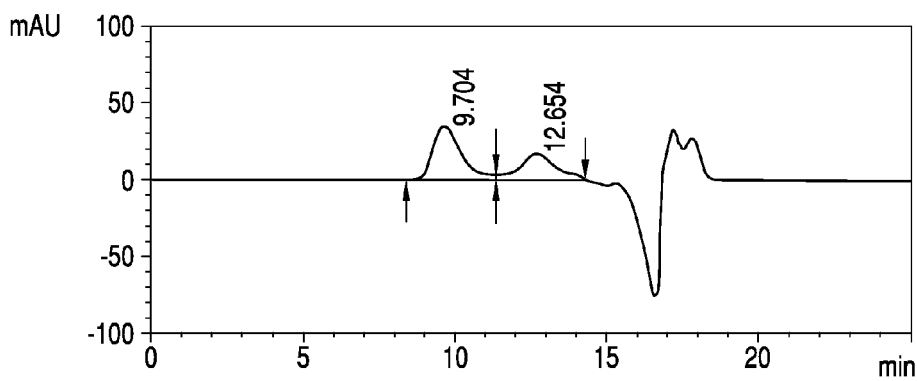

1  PDA Multi 1/230nm 4nm         Peak Table

PDA Ch1 230nm 4nm

| Peak# | Ret. Time | Area    | Area%   |
|-------|-----------|---------|---------|
| 1     | 9.704     | 2297159 | 60.446  |
| 2     | 12.654    | 1503218 | 39.554  |
| Total |           | 3800377 | 100.000 |

FIG. 7

Syngene International Ltd

C:\LabSolutions\Data\Y2012\OCT2012\POLOXAMER\A529453.lcd

| | | |
|---|---|---|
| Sample Name | :FS09458-036 | Injection Volume : 100μL |
| Sample ID | :A529453 | Tray# |
| Data File Name | :A529453.lcd | Vial#    : 10 |
| Method File Name | :C:\LabSolutions\Methods\POLOXAMER.lcm | |
| Data Acquired | :12Oct12 9:55:12 PM | |

Method information : SHODEX KB-804(300 x 8)mm
　　　　　　　　　Mobile Phase D: SODIUM ACETATE BUFFER
　　　　　　　　　Flow : 0.7ml/min
　　　　　　　　　Column oven : 35°C
　　　　　　　INJECTION VOLUME: 100μl
　　　　　　　　RUN TIME     : 25min

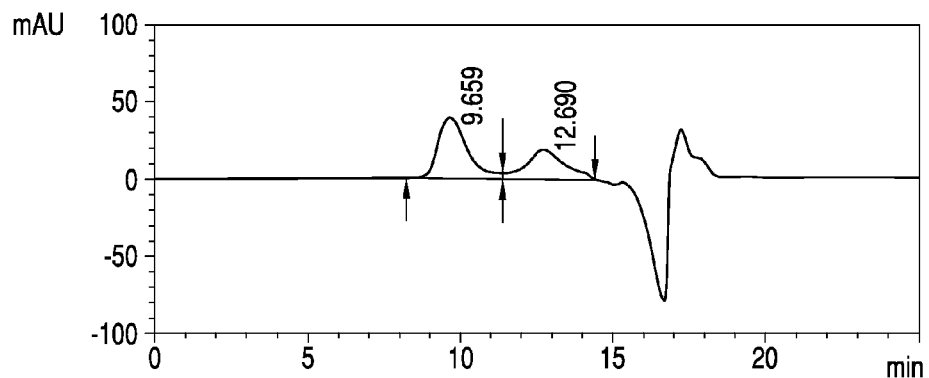

1  PDA Multi 1/230nm 4nm        Peak Table

PDA Ch1 230nm 4nm

| Peak# | Ret. Time | Area | Area% |
|---|---|---|---|
| 1 | 9.659 | 2593651 | 61.912 |
| 2 | 12.690 | 1595599 | 38.088 |
| Total | | 4189250 | 100.000 |

FIG. 8

Syngene International Ltd

C:\LabSolutions\Data\Y2012\OCT2012\POLOXAMER\A529453A.lcd

| | | | |
|---|---|---|---|
| Sample Name | :FS09458-036 | Injection Volume : 100μL | |
| Sample ID | :A529453 | Tray# | |
| Data File Name | :A529453A.lcd | Vial# | : 11 |
| Method File Name | :C:\LabSolutions\Methods\POLOXAMER.lcm | | |
| Data Acquired | :12Oct12 10:20:46 PM | | |

Method information : SHODEX KB-804(300 x 8)mm
                       Mobile Phase D: SODIUM ACETATE BUFFER
                       Flow : 0.7ml/min
                       Column oven : 35°C
                INJECTION VOLUME: 100μl
                RUN TIME      : 25min

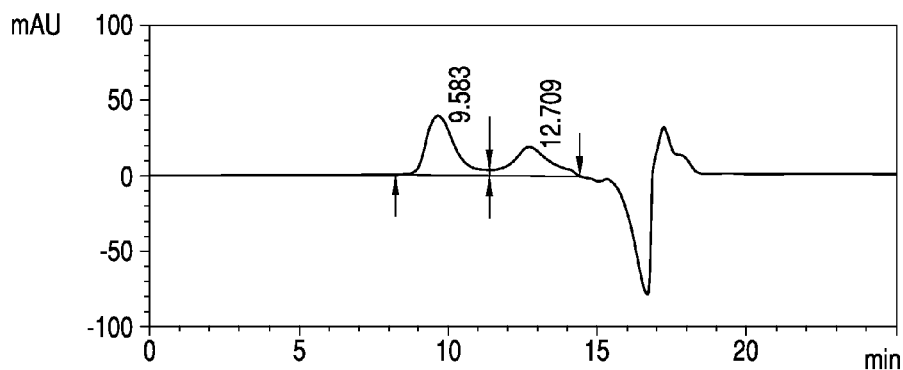

1 PDA Multi 1/230nm 4nm        Peak Table

PDA Ch1 230nm 4nm

| Peak# | Ret. Time | Area | Area% |
|---|---|---|---|
| 1 | 9.583 | 2614811 | 60.695 |
| 2 | 12.709 | 1693300 | 39.305 |
| Total | | 4308111 | 100.000 |

FIG. 9

| Syngene | GC Report | SC/AD/02-003 |

```
Data file name       : C:\HPCHEM\1\DATA\10OCT12A\STD-3A.D
Acquisition method   : FFAP-3.M
ANALYSIS DATE        : 11/Oct/12  9:11:46 PM     Operator         :JEEVAN
Sample Name          : STANDARD-3               Vial No.         :Vial 4
Sample Info          : DMF                      Injection volume :1.0μL
```

```
Column              :FFAP 30m x 0.53mm x 1micron
Flow                :2.0mL/min
Inlet temperature   :150°C
Detector temperature:260°C
Split Ratio         : 5:1
Injection volume    :1.0μL
Oven temperature    :Initial 50°C (hold for 2 mins)
                     Ramp 15°C up to 230°C (hold for 15mins)
```

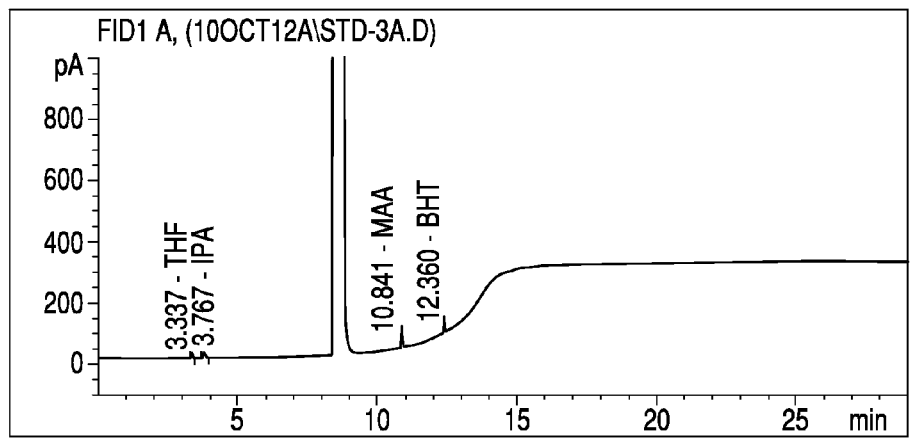

| # | Meas. Ret. Time | Compund Name | Area | Area % |
|---|---|---|---|---|
| 1 | 3.337 | THF | 77.716 | 17.056 |
| 2 | 3.767 | IPA | 77.771 | 17.068 |
| 3 | 10.841 | MAA | 172.812 | 37.926 |
| 4 | 12.360 | BHT | 127.356 | 27.950 |

FIG. 12

Syngene                    GC Report                    SC/AD/02-003
================================================================
    Data file name        : C:\HPCHEM\1\DATA\10OCT12A\A529453.D
    Acquisition method    : FFAP-3.M
    ANALYSIS DATE         : 12/Oct/12  1:32:07 AM      Operator         :JEEVAN
    Sample Name           : FS09458-036                Vial No.         :Vial 11
    Sample Info           : A529453                    Injection volume :1.0μL
                            TEST SAMPLE-1

================================================================
    Column                :FFAP 30m x 0.53mm x 1micron
    Flow                  :2.0mL/min
    Inlet temperature     :150°C
    Detector temperature  :260°C
    Split Ratio           : 5:1
    Injection volume      :1.0μL
    Oven temperature      :Initial 50°C (hold for 2 mins)
                           Ramp 15°C up to 230°C (hold for 15mins)

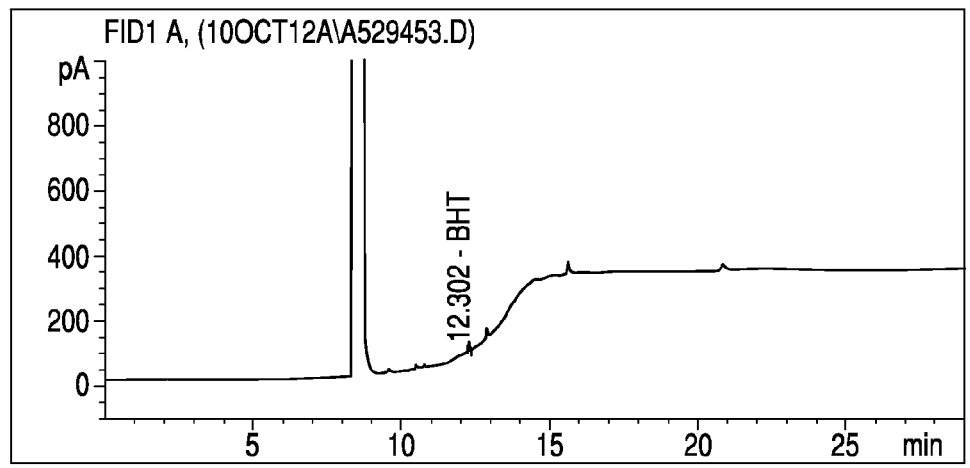

| # | Meas. Ret. Time | Compound Name | Area | Area % |
|---|---|---|---|---|
| 1 | 0.000 | THF | 0.000 | 0.000 |
| 2 | 0.000 | IPA | 0.000 | 0.000 |
| 3 | 0.000 | MAA | 0.000 | 0.000 |
| 4 | 12.302 | BHT | 73.102 | 100.000 |

FIG. 13

| | | | | |
|---|---|---|---|---|
| Sample: | FS09458-036; A534706 | | | |
| Injection Date: | 18-Oct-12, 21:28:25 | | | |
| Calibration File: | C:\Chem32\GPC\calib\2010\2012\PEG003.CAL | | | |
| Calibration Date: | Wednesday 24/10/12 08:51:24 | | | |
| Baseline from: | 0.000 min | | Baseline to: | 34.015 min |
| Integration from: | 15.552 min | | Integration to: | 21.561 min |
| MHK-A(Cal.): | 0.000000E+0 | | MHK-K(Cal.): | 1.000000E+0 ml/g |
| Eluent: | DMF | | Flowrate: | 0.800 ml/min |
| Concentration: | 1.000 g/l | | Inject volume: | 50.000 ul |
| Column 1: | 2 x Resipore | | Temperature: | 49.980 C |
| Detector 1: | RID A, Refractive Index Signal | | Delay volume: | 0.000 ml |
| Operator: | Pradeepa | | Acquisition interval: | 0.430 sec |

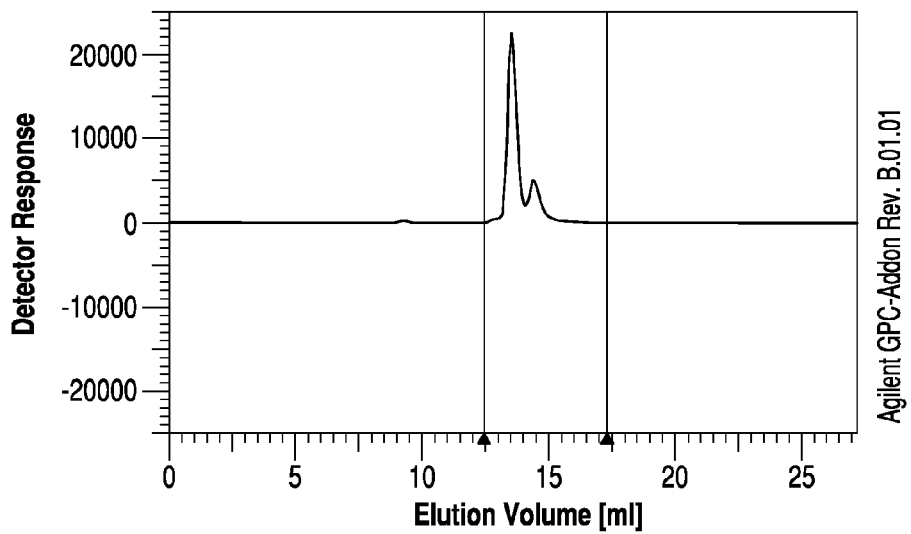

__rid1A__

| | | |
|---|---|---|
| __Mn__ : | 7.5050e3 | g/mol |
| __Mw__ : | 9.0164e3 | g/mol |
| __Mz__ : | 1.0045e4 | g/mol |
| __Mv__ : | 0.000000 | g/mol |
| __D__ : | 1.2014e0 | |
| [n] : | 0.000000 | ml/g |
| Vp : | 1.3547e1 | ml |
| Mp : | 1.0199e4 | g/mol |
| A : | 1.2787e4 | ml*V |
| 10% | 4.9691e3 | g/mol |
| 30% | 8.0057e3 | g/mol |
| 50% | 9.4282e3 | g/mol |
| 70% | 1.0457e4 | g/mol |
| 90% | 1.1957e4 | g/mol |

FIG. 15

Syngene International Ltd

C:\LabSolutions\Data\Y2012\OCT2012\POLOXAMER_002\005.lcd

| | | | |
|---|---|---|---|
| Sample Name | :STD-1 | Injection Volume : 100μL | |
| Sample ID | : | Tray# : 1 | |
| Data File Name | :005.lcd | Vial# : 3 | |
| Method File Name | :C:\LabSolutions\Methods\POLOXAMER.lcm | | |
| Data Acquired | :17Oct12 10:34:05 PM | | |

Method information : SHODEX KB-804(300 x 8)mm
                       Mobile Phase D: SODIUM ACETATE BUFFER
                       Flow : 0.7ml/min
                       Column oven : 35°C
              INJECTION VOLUME: 100μl
              RUN TIME     : 25min

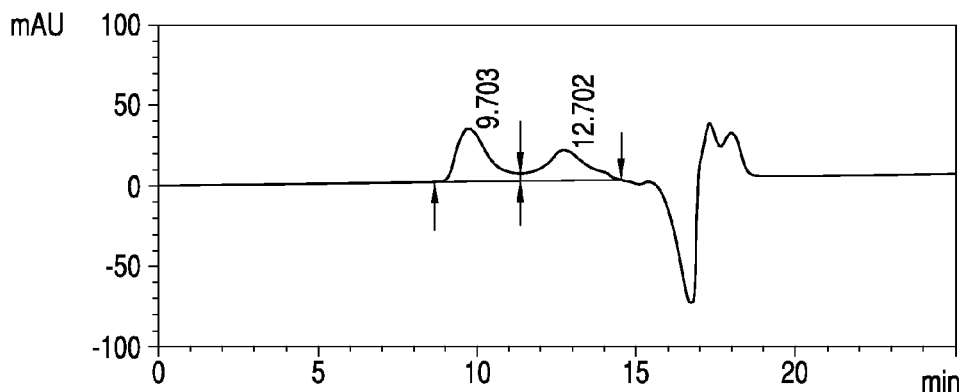

1 PDA Multi 1/230nm 4nm

Peak Table

PDA Ch1 230nm 4nm

| Peak# | Ret. Time | Area | Area% |
|---|---|---|---|
| 1 | 9.703 | 2242333 | 56.243 |
| 2 | 12.702 | 1744509 | 43.757 |
| Total | | 3986841 | 100.000 |

FIG. 17

Syngene International Ltd

C:\LabSolutions\Data\Y2012\OCT2012\POLOXAMER_002\006.lcd

| | | | |
|---|---|---|---|
| Sample Name | :STD-2 | Injection Volume : 100μL | |
| Sample ID | : | Tray# : 1 | |
| Data File Name | :006.lcd | Vial# : 3 | |
| Method File Name | :C:\LabSolutions\Methods\POLOXAMER.lcm | | |
| Data Acquired | :17Oct12 10:59:42 PM | | |

Method information : SHODEX KB-804(300 x 8)mm
                   Mobile Phase D: SODIUM ACETATE BUFFER
                   Flow : 0.7ml/min
                   Column oven : 35°C
              INJECTION VOLUME: 100μl
               RUN TIME     : 25min

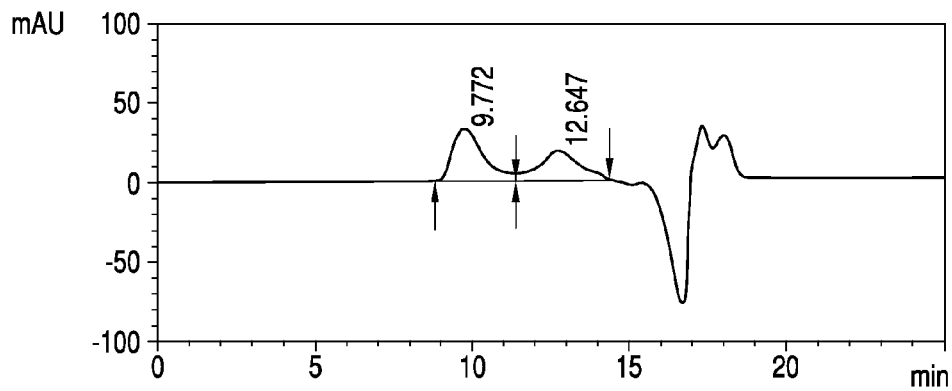

1 PDA Multi 1/230nm 4nm

Peak Table

PDA Ch1 230nm 4nm

| Peak# | Ret. Time | Area | Area% |
|---|---|---|---|
| 1 | 9.722 | 2184706 | 57.226 |
| 2 | 12.647 | 1632958 | 42.774 |
| Total | | 3817663 | 100.000 |

FIG. 18

Syngene International Ltd

C:\LabSolutions\Data\Y2012\OCT2012\POLOXAMER_002\007.lcd

| | | |
|---|---|---|
| Sample Name | :STD-3 | Injection Volume : 100μL |
| Sample ID | : | Tray# : 1 |
| Data File Name | :007.lcd | Vial# : 3 |
| Method File Name | :C:\LabSolutions\Methods\POLOXAMER.lcm | |
| Data Acquired | :17Oct12 11:25:20 PM | |

Method information : SHODEX KB-804(300 x 8)mm
　　　　　　　　　Mobile Phase D: SODIUM ACETATE BUFFER
　　　　　　　　　Flow : 0.7ml/min
　　　　　　　　　Column oven : 35°C
　　　　　INJECTION VOLUME: 100μl
　　　　　　　RUN TIME　　: 25min

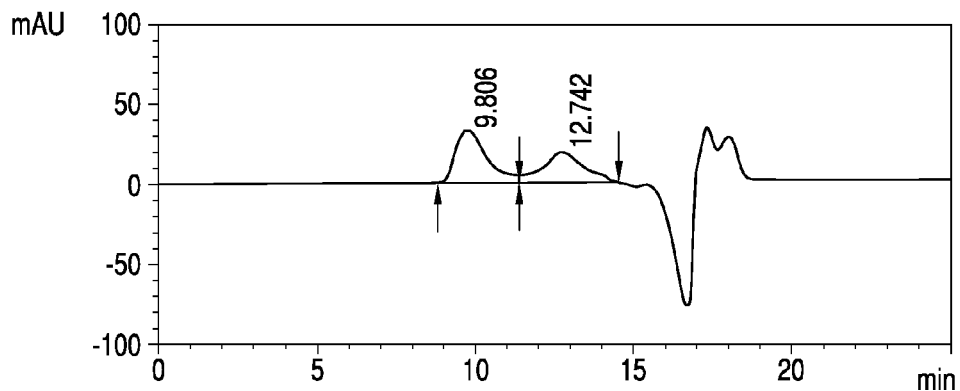

1 PDA Multi 1/230nm 4nm

Peak Table

PDA Ch1 230nm 4nm

| Peak# | Ret. Time | Area | Area% |
|---|---|---|---|
| 1 | 9.806 | 2156436 | 55.714 |
| 2 | 12.742 | 1714115 | 44.286 |
| Total | | 3870551 | 100.000 |

FIG. 19

Syngene International Ltd

C:\LabSolutions\Data\Y2012\OCT2012\POLOXAMER_002\008.lcd

| | | | |
|---|---|---|---|
| Sample Name | :STD-4 | Injection Volume : 100μL | |
| Sample ID | : | Tray# : 1 | |
| Data File Name | :008.lcd | Vial# : 3 | |
| Method File Name | :C:\LabSolutions\Methods\POLOXAMER.lcm | | |
| Data Acquired | :17Oct12 11:50:57 PM | | |

Method information : SHODEX KB-804(300 x 8)mm
　　　　　　　　　Mobile Phase D: SODIUM ACETATE BUFFER
　　　　　　　　　Flow : 0.7ml/min
　　　　　　　　　Column oven : 35°C
　　　　　　　　INJECTION VOLUME: 100μl
　　　　　　　　　RUN TIME　　: 25min

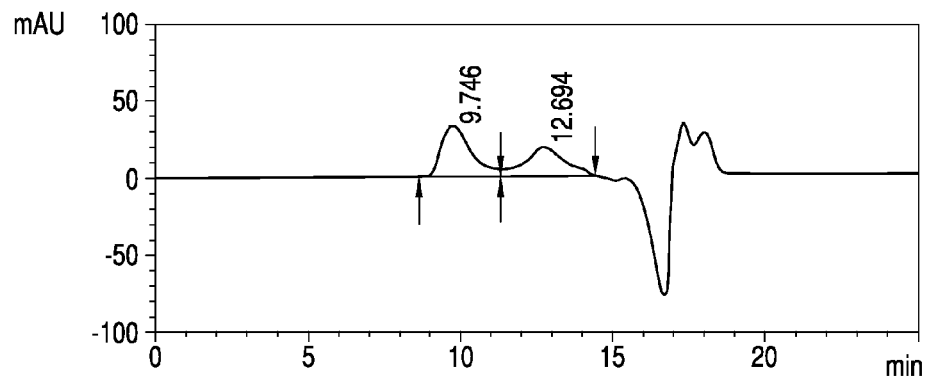

1 PDA Multi 1/230nm 4nm

Peak Table

PDA Ch1 230nm 4nm

| Peak# | Ret. Time | Area | Area% |
|---|---|---|---|
| 1 | 9.746 | 2176410 | 56.327 |
| 2 | 12.694 | 1687458 | 43.673 |
| Total | | 3863868 | 100.000 |

FIG. 20

Syngene International Ltd

C:\LabSolutions\Data\Y2012\OCT2012\POLOXAMER_002\009.lcd

| | | | |
|---|---|---|---|
| Sample Name | :STD-5 | Injection Volume : 100μL | |
| Sample ID | : | Tray# : 1 | |
| Data File Name | :009.lcd | Vial# : 3 | |
| Method File Name | :C:\LabSolutions\Methods\POLOXAMER.lcm | | |
| Data Acquired | :18Oct12 12:16:35 AM | | |

Method information : SHODEX KB-804(300 x 8)mm
                    Mobile Phase D: SODIUM ACETATE BUFFER
                    Flow : 0.7ml/min
                    Column oven : 35°C
            INJECTION VOLUME: 100μl
              RUN TIME    : 25min

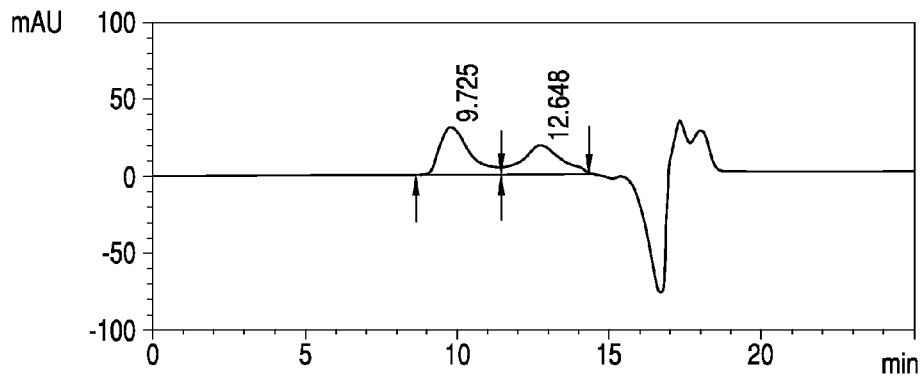

1 PDA Multi 1/230nm 4nm

Peak Table

PDA Ch1 230nm 4nm

| Peak# | Ret. Time | Area | Area% |
|---|---|---|---|
| 1 | 9.725 | 2159765 | 57.721 |
| 2 | 12.648 | 1581961 | 42.279 |
| Total | | 3741726 | 100.000 |

FIG. 21

Syngene International Ltd

C:\LabSolutions\Data\Y2012\OCT2012\POLOXAMER_002\010.lcd

| | | | |
|---|---|---|---|
| Sample Name | :STD-6 | Injection Volume : 100μL | |
| Sample ID | : | Tray# : 1 | |
| Data File Name | :010.lcd | Vial# : 3 | |
| Method File Name | :C:\LabSolutions\Methods\POLOXAMER.lcm | | |
| Data Acquired | :18Oct12 12:42:12 AM | | |

Method information : SHODEX KB-804(300 x 8)mm
          Mobile Phase D: SODIUM ACETATE BUFFER
          Flow : 0.7ml/min
          Column oven : 35°C
       INJECTION VOLUME: 100μl
         RUN TIME    : 25min

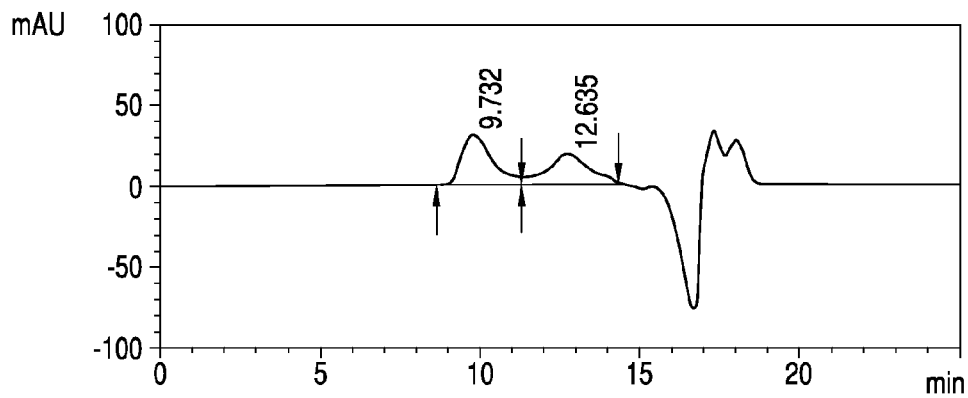

1 PDA Multi 1/230nm 4nm

Peak Table

PDA Ch1 230nm 4nm

| Peak# | Ret. Time | Area | Area% |
|---|---|---|---|
| 1 | 9.732 | 2107640 | 56.283 |
| 2 | 12.635 | 1637102 | 43.717 |
| Total | | 3744742 | 100.000 |

FIG. 22

Syngene International Ltd

C:\LabSolutions\Data\Y2012\OCT2012\POLOXAMER_002\022.lcd

| | | | |
|---|---|---|---|
| Sample Name | :FS09458-037 | Injection Volume : 100μL | |
| Sample ID | :A532877 | Tray# : | |
| Data File Name | :022.lcd | Vial# | : 15 |
| Method File Name | :C:\LabSolutions\Methods\POLOXAMER.lcm | | |
| Data Acquired | :18Oct12 5:49:54 AM | | |

Method information : SHODEX KB-804(300 x 8)mm
                       Mobile Phase D: SODIUM ACETATE BUFFER
                       Flow : 0.7ml/min
                       Column oven : 35°C
          INJECTION VOLUME: 100μl
          RUN TIME       : 25min

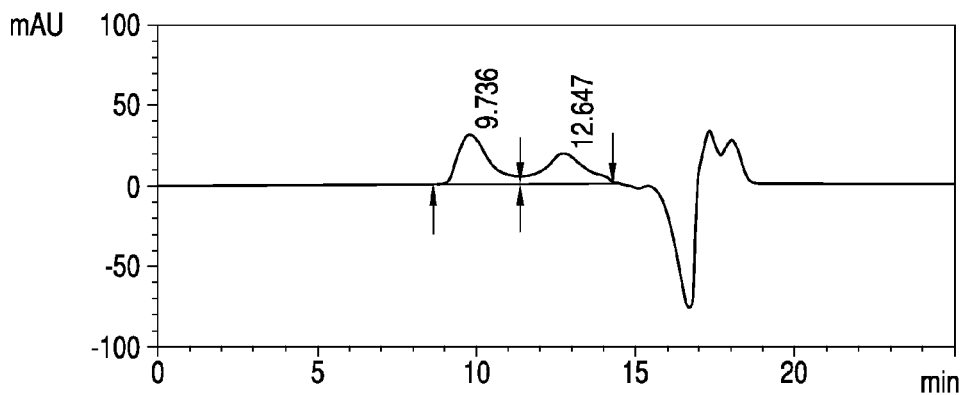

1 PDA Multi 1/230nm 4nm

Peak Table

PDA Ch1 230nm 4nm

| Peak# | Ret. Time | Area | Area% |
|---|---|---|---|
| 1 | 9.736 | 2213491 | 57.749 |
| 2 | 12.647 | 1619436 | 42.251 |
| Total | | 3832927 | 100.000 |

FIG. 23

Syngene International Ltd

C:\LabSolutions\Data\Y2012\OCT2012\POLOXAMER_002\021.lcd

| | | |
|---|---|---|
| Sample Name | :FS09458-037 | Injection Volume : 100μL |
| Sample ID | :A532877 | Tray# : |
| Data File Name | :021.lcd | Vial# : 14 |
| Method File Name | :C:\LabSolutions\Methods\POLOXAMER.lcm | |
| Data Acquired | :18Oct12 5:24:18 AM | |

Method information : SHODEX KB-804(300 x 8)mm
                     Mobile Phase D: SODIUM ACETATE BUFFER
                     Flow : 0.7ml/min
                     Column oven : 35°C
            INJECTION VOLUME: 100μl
            RUN TIME    : 25min

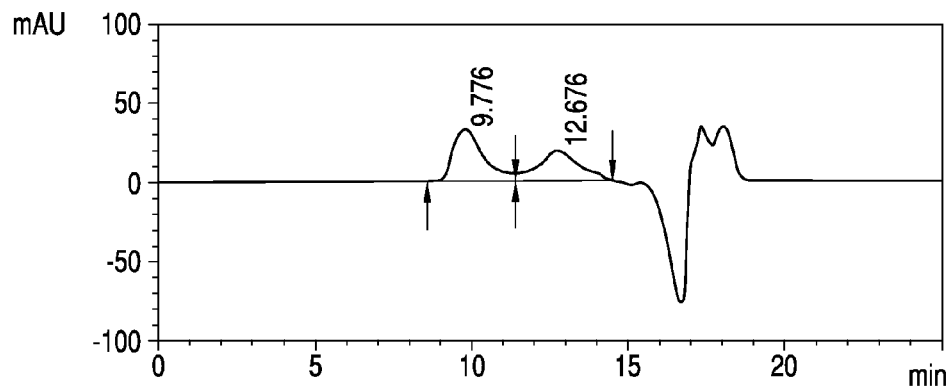

1 PDA Multi 1/230nm 4nm

Peak Table

PDA Ch1 230nm 4nm

| Peak# | Ret. Time | Area | Area% |
|---|---|---|---|
| 1 | 9.776 | 2234443 | 56.651 |
| 2 | 12.676 | 1709801 | 43.349 |
| Total | | 3944243 | 100.000 |

FIG. 24

| Syngene | GC Report | SC/AD/02-003 |

| | |
|---|---|
| Data file name | : C:\HPCHEM\1\DATA\17OCT12\A532877.D |
| Acquisition method | : FFAP-3.M |
| ANALYSIS DATE | : 18/Oct/12  8:01:15 AM |
| Sample Name | : FS09458-037 |
| Sample Info | : A532877 TEST SAMPLE-1 |

| Operator | :JEEVAN |
| Vial No. | :Vial 16 |
| Injection volume | :1.0μL |

| | |
|---|---|
| Column | :FFAP 30m x 0.53mm x 1micron |
| Flow | :2.0mL/min |
| Inlet temperature | :150°C |
| Detector temperature | :260°C |
| Oven temperature | :50°C (hold for 2 mins) 15°C - 230°C (hold for 15mins) |

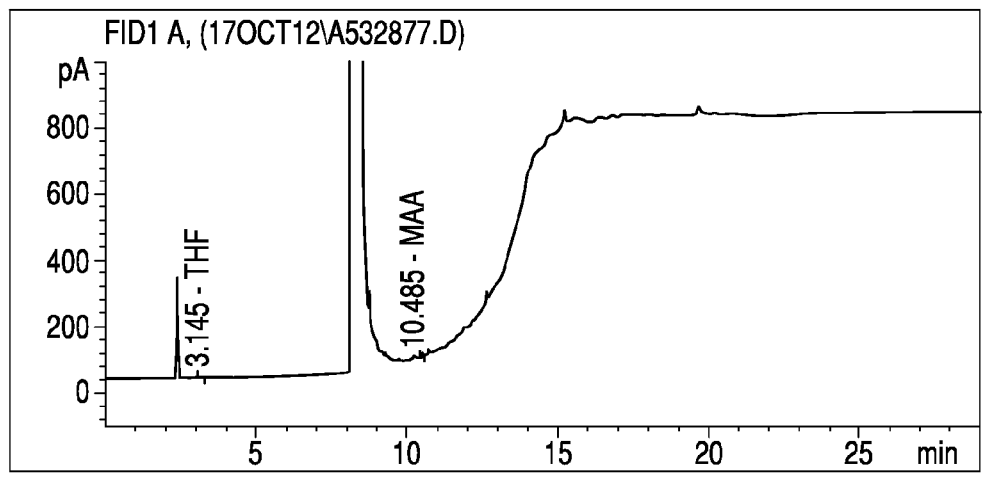

| Compound Name | # | Measured Ret. Ti | Area | Area % |
|---|---|---|---|---|
| THF | 1 | 3.145 | 10.626 | 38.832 |
| IPA | 2 | 0.000 | 0.000 | 0.000 |
| MAA | 3 | 10.485 | 16.737 | 61.168 |
| BHT | 4 | 0.000 | 0.000 | 0.000 |

FIG. 26

| | | | | | |
|---|---|---|---|---|---|
| Sample: | FS09458-037; A534710 | | | | |
| Injection Date: | 18-Oct-12, 22:07:46 | | | | |
| Calibration File: | C:\Chem32\GPC\calib\2010\2012\PEG003.CAL | | | | |
| Calibration Date: | Wednesday 24/10/12 08:51:24 | | | | |
| Baseline from: | 0.007 min | | Baseline to: | 34.480 min | |
| Integration from: | 15.228 min | | Integration to: | 21.358 min | |
| MHK-A(Cal.): | 0.000000E+0 | | MHK-K(Cal.): | 1.000000E+0 min | |
| Eluent: | DMF | | Flowrate: | 0.800 ml/min | |
| Concentration: | 1.000 g/l | | Inject volume: | 50.000 ul | |
| Column 1: | 2 x Resipore | | Temperature: | 50.000 C | |
| Detector 1: | RID A, Refractive Index Signal | | Delay volume: | 0.000 ml | |
| Operator: | Pradeepa | | Acquisition interval: | 0.430 sec | |

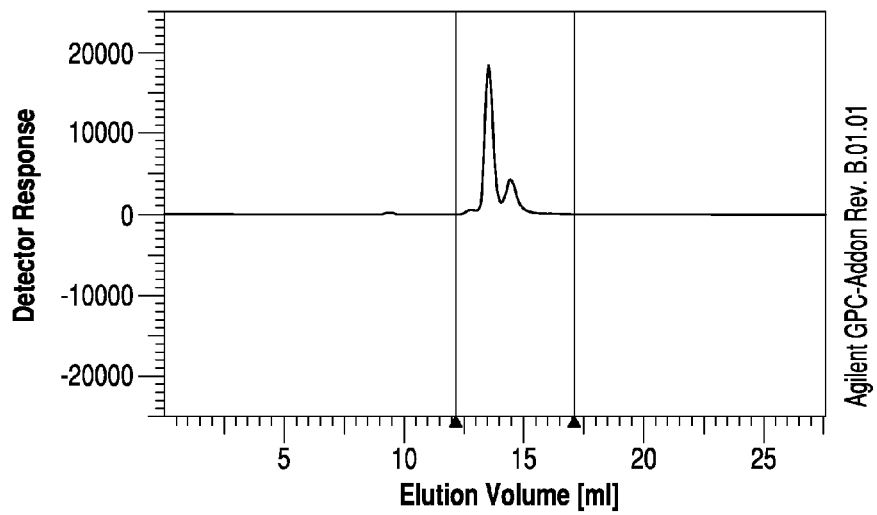

rid1A

| | | |
|---|---|---|
| Mn : | 7.5378e3 | g/mol |
| Mw : | 9.1880e3 | g/mol |
| Mz : | 1.0710e4 | g/mol |
| Mv : | 0.000000 | g/mol |
| D : | 1.2189e0 | |
| [n] : | 0.000000 | ml/g |
| Vp : | 1.3530e1 | ml |
| Mp : | 1.0357e4 | g/mol |
| A : | 1.0437e4 | ml*V |
| 10% | 4.8632e3 | g/mol |
| 30% | 7.9418e3 | g/mol |
| 50% | 9.5073e3 | g/mol |
| 70% | 1.0551e4 | g/mol |
| 90% | 1.2102e4 | g/mol |

FIG. 31

Syngene International Ltd

C:\LabSolutions\LCsolution\Data\DEC12\18dec12\006.lcd

| | | | |
|---|---|---|---|
| Sample Name | :STANDARD-1 | Injection Volume : 100μL | |
| Sample ID | :STANDARD-1 | Tray# | : 1 |
| Data File Name | :006.lcd | Vial# | : 3 |
| Method File Name | :polox.lcm | | |
| Data Acquired | :12/18/2012  4:53:11  PM | | |

Method information:
Column:  Shodex (300 X 8)mm, 5μm,
Mobile Phase : Sodium acetate buffer
Flow : 0.7 mL/min
Run time: 25 min

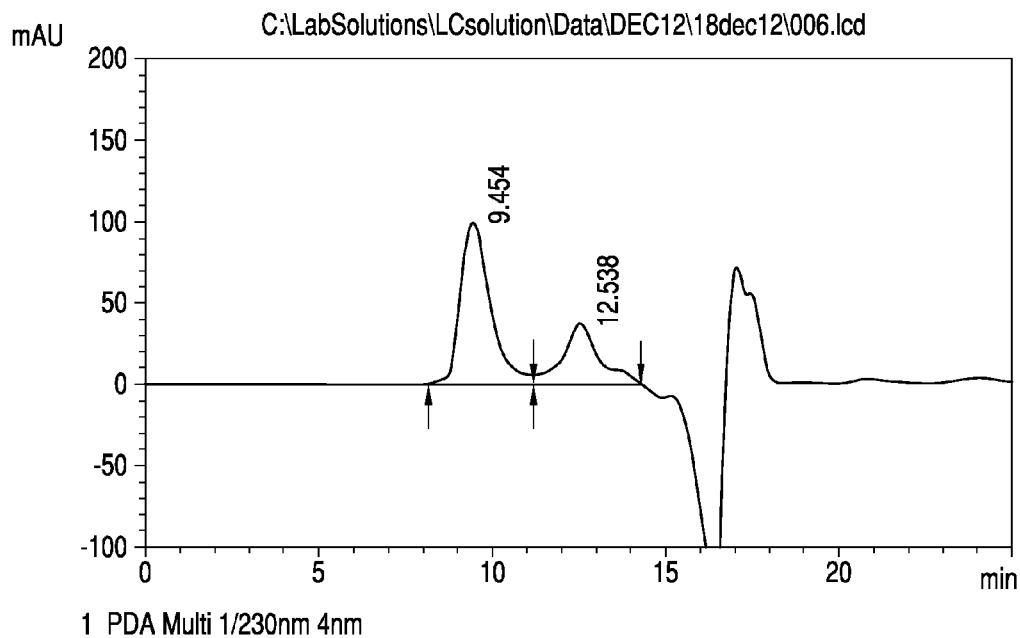

1  PDA Multi 1/230nm 4nm

Peak Table
PDA Ch1 230nm 4nm

| Peak# | Ret. Time | Area | Area% |
|---|---|---|---|
| 1 | 9.454 | 5941334 | 68.590 |
| 2 | 12.538 | 2720732 | 31.410 |
| Total | | 8662066 | 100.000 |

FIG. 33

Syngene International Ltd

C:\LabSolutions\LCsolution\Data\DEC12\18dec12\008.lcd

| | | | |
|---|---|---|---|
| Sample Name | :STANDARD-3 | Injection Volume | :100μL |
| Sample ID | :STANDARD-3 | Tray# | :1 |
| Data File Name | :008.lcd | Vial# | :3 |
| Method File Name | :polox.lcm | | |
| Data Acquired | :12/18/2012  5:44:31  PM | | |

Method information:
Column: Shodex (300 X 8)mm, 5μm,
Mobile Phase : Sodium acetate buffer
Flow : 0.7 mL/min
Run time: 25 min

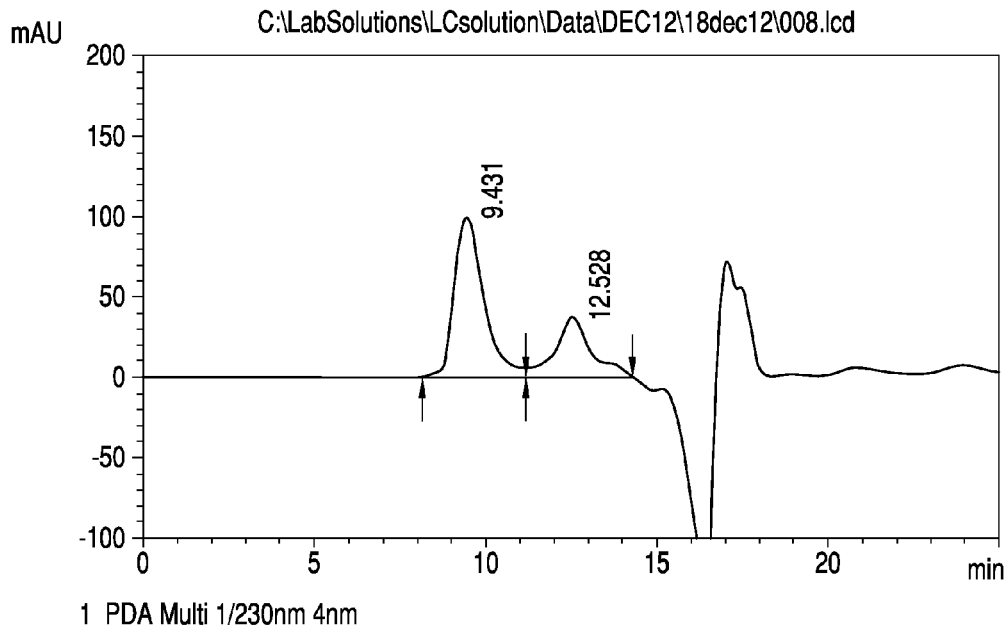

1  PDA Multi 1/230nm 4nm

Peak Table
PDA Ch1 230nm 4nm

| Peak# | Ret. Time | Area | Area% |
|---|---|---|---|
| 1 | 9.431 | 5992173 | 68.340 |
| 2 | 12.528 | 2775991 | 31.660 |
| Total | | 8768164 | 100.000 |

FIG. 35

Syngene International Ltd

C:\LabSolutions\LCsolution\Data\DEC12\18dec12\009.lcd

| | | | |
|---|---|---|---|
| Sample Name | :STANDARD-4 | Injection Volume : 100μL | |
| Sample ID | :STANDARD-4 | Tray# | : 1 |
| Data File Name | :009.lcd | Vial# | : 3 |
| Method File Name | :polox.lcm | | |
| Data Acquired | :12/18/2012  6:10:12 PM | | |

Method information:
Column: Shodex (300 X 8)mm, 5μm,
Mobile Phase : Sodium acetate buffer
Flow : 0.7 mL/min
Run time: 25 min

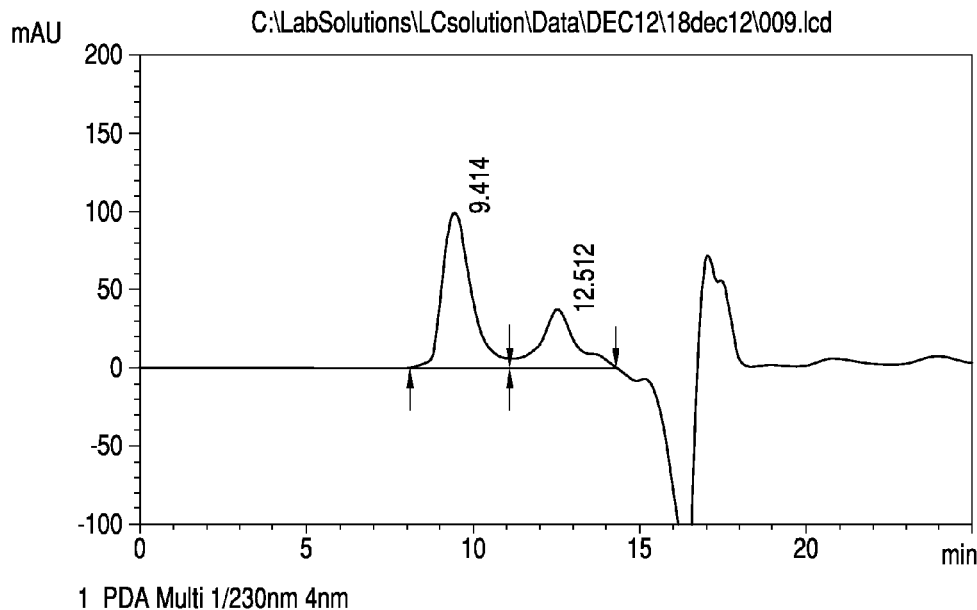

Peak Table
PDA Ch1 230nm 4nm

| Peak# | Ret. Time | Area | Area% |
|---|---|---|---|
| 1 | 9.414 | 5989656 | 68.894 |
| 2 | 12.512 | 2704351 | 31.106 |
| Total | | 8694006 | 100.000 |

FIG. 36

Syngene International Ltd

C:\LabSolutions\LCsolution\Data\DEC12\18dec12\011.lcd

| | | | |
|---|---|---|---|
| Sample Name | :STANDARD-6 | Injection Volume | :100μL |
| Sample ID | :STANDARD-6 | Tray# | :1 |
| Data File Name | :011.lcd | Vial# | :3 |
| Method File Name | :polox.lcm | | |
| Data Acquired | :12/18/2012 7:01:33 PM | | |

Method information:
Column: Shodex (300 X 8)mm, 5μm,
Mobile Phase : Sodium acetate buffer
Flow : 0.7 mL/min
Run time: 25 min

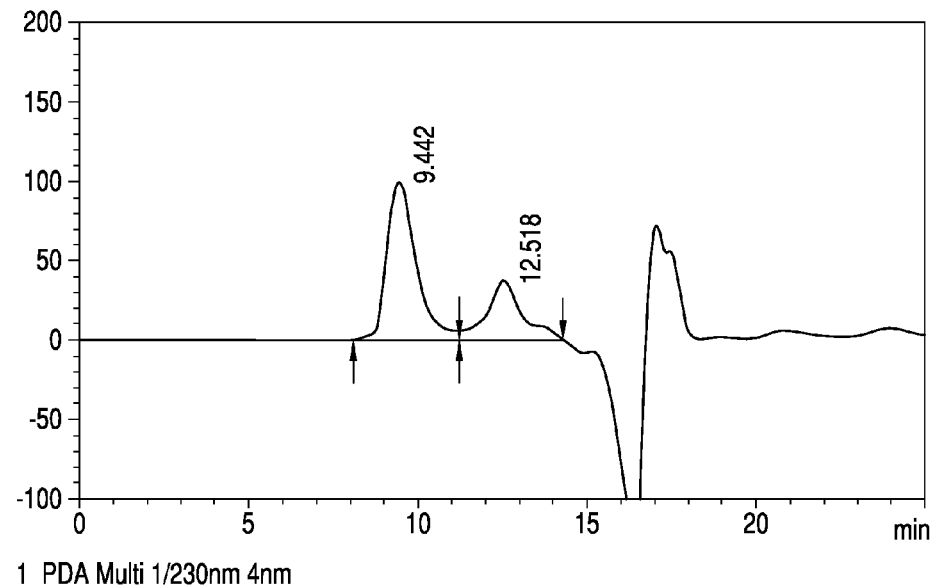

Peak Table
PDA Ch1 230nm 4nm

| Peak# | Ret. Time | Area | Area% |
|---|---|---|---|
| 1 | 9.442 | 6069636 | 68.260 |
| 2 | 12.518 | 2822317 | 31.740 |
| Total | | 8891953 | 100.000 |

FIG. 38

Sample: FS09903-070; A576683
Injection Date: 15-Dec-12, 15:10:58
Calibration File: C:\Chem32\GPC\calib\2010\2012\peg006.CAL
Calibration Date: Monday 17/12/12 09:02:18
Baseline from: 2.015 min          Baseline to: 34.007 min
Integration from: 15.507 min      Integration to: 21.451 min
MHK-A(Cal.): 0.000000E+0          MHK-K(Cal.): 1.000000E+0 ml/g
Eluent: DMF                       Flowrate: 0.800 ml/min
Concentration: 1.000 g/l          Inject volume: 100.000 ul
Column 1: 2 x Resipore            Temperature: 49.980 C
Detector 1: RID A, Refractive Index Signal   Delay volume: 0.000 ml
Detector 1: RID D, Polarity       Delay volume: 0.000 ml
Operator: Jeevanantham            Acquisition interval: 0.430 sec

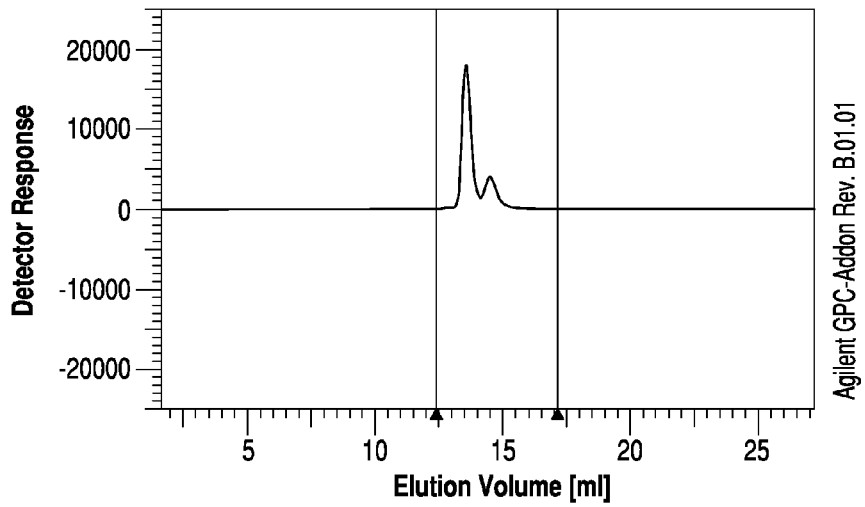

rid1A

Mn : 7.5472e3 g/mol
Mw : 9.5180e3 g/mol
Mz : 1.1032e4 g/mol
Mv : 0.000000 g/mol
D : 1.2611e0
[n] : 0.000000 ml/g
Vp : 1.3565e1 ml
Mp : 1.1355e4 g/mol
A : 1.0115e4 ml*V
10% 4.1360e4 g/mol
30% 8.0996e4 g/mol
50% 1.0144e4 g/mol
70% 1.1518e4 g/mol
90% 1.3379e4 g/mol

FIG. 42

SYNTHESIS OF FREE RADICAL POLYMERIZABLE ETHYLENICALLY UNSATURATED POLOXAMERS AND POLOXAMINES

BACKGROUND OF THE INVENTION

Poloxamer F127 block copolymers are known compounds and are generally available under the trademark PLURONIC. These block copolymers consist of hydrophilic poly(ethylene oxide) (PEO) and hydrophobic poly(propylene oxide) (PPO) blocks arranged in A-B-A tri-block structure: PEO-PPO-PEO with end terminal hydroxyl groups. In some instances, unmodified Poloxamer can be used in medical devices such as ophthalmic lenses.

Poloxamers have the following general formula:

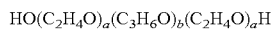

Reverse poloxamers are also known block copolymers and have the following general formula:

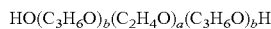

wherein a and b may be the same or different and are of varying lengths.

Poloxamers and reverse poloxamers have end terminal hydroxyl groups that can be functionalized to be free radical polymerizable ethylenically unsaturated end groups. An example of a free radical polymerizable ethylenically unsaturated end terminal functionalized poloxamer is poloxamer dimethacrylate (e.g., PLURONIC F-127 dimethacrylate) as disclosed in US Patent Publication No. 2003/0044468 to Cellesi et al. U.S. Pat. No. 6,517,933 discloses glycidyl-terminated copolymers of polyethylene glycol and polypropylene glycol. U.S. Pat. No. 8,377,464 discloses polymerizable surfactants and a method of making same.

Poloxamers and reverse poloxamers are surfactants with varying HLB values based upon the varying values of a and b, a representing the number of hydrophilic poly(ethylene oxide) units (PEO) being present in the molecule and b representing the number of hydrophobic poly(propylene oxide) units (PPO) being present in the molecule. While poloxamers and reverse poloxamers are considered to be difunctional molecules (based on the terminal hydroxyl groups) they are also available in a tetrafunctional form known as poloxamines, trade name TETRONIC. For poloxamines, the molecules are tetrafunctional block copolymers terminating in primary hydroxyl groups and linked by a central diamine. Poloxamines have the following general structure:

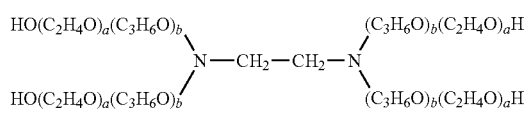

Reverse poloxamines are also known and have varying HLB values based upon the relative ratios of a to b wherein a and b are as defined above.

Polyethers, such as poloxamers and poloxamines block copolymers, that are present at the surface of substrates have long been known to inhibit bacterial adhesion and to reduce the amount of lipid and protein deposition (non-fouling surface). In the present invention, we provide an improved synthesis of free radical polymerizable ethylenically unsaturated end terminal functionalized poloxamer and/or poloxamine block copolymers (BASF Corp.). The improved synthesis of free radical polymerizable ethylenically unsaturated end terminal functionalized poloxamer and/or poloxamine block copolymers provides improved overall device performance when the block copolymers prepared according to the invention described herein are included in ophthalmic device forming formulations.

It is known the terminal hydroxyl groups of PLURONIC F-127 can be functionalized to provide the desired reactivity/purpose as part of the total monomer mix, before/after polymerization. Most of the materials described in the literature that respond to external stimuli are acrylic group containing molecules. So, for example, acrylated PLURONIC F-127 is of importance in some lens formulation.

Whether to acrylate the terminal hydroxyl groups in poloxamers can be determined by the functional group of the other reactive molecules in the monomer mixture. The acrylation can be achieved by the reaction of (unmodified) poloxamers and poloxamines such as PLURONIC F-127 with methacryloyl chloride or methacryloyl anhydride in the presence of a suitable base. Since PLURONIC F-127 is an EO-PO block copolymer, it is known to be susceptible to possible degradation upon coming into contact with free radicals; thus yielding undesired reaction byproducts such as high molecular weight impurities when produced under commercial manufacturing conditions. In addition, residual reaction solvent(s), inhibitors, inorganic salts and methacrylic acid (MAA) may also remain in the free radical polymerizable ethylenically unsaturated end terminal functionalized poloxamers and reverse poloxamers. An example of a free radical polymerizable ethylenically unsaturated end terminal functionalized poloxamer is poloxamer dimethacrylate (e.g., PLURONIC F-127 dimethacrylate). PLURONIC F-127 DM, (DM meaning dimethacrylate), made by previously known commercial scale synthetic methods resulted in a grade of material which was routinely outside of the manufacturing specifications for use in forming certain medical devices. This is important because these byproducts may be injurious to the desired polymerization of PLURONIC F-127 DM, particularly when they are being used in a monomer mix for contact lens production. Any undesired and/or high molecular weight impurity can greatly interfere with lens processing, as well as properties and/or performance of the commercialized contact lens. Therefore, it is desirable that functionalized block copolymers such as PLURONIC F-127 DM prepared in commercial scale amounts be free of any high molecular weight impurities which are beyond the limits set in the manufacturing specifications.

In the commercial scale synthesis of PLURONIC F-127 DM, 2,6-ditert-butyl-4-methyl phenol (BHT) is added as a free radical inhibitor to minimize the formation of these undesired byproducts. However, this synthesis is still unable to prevent the formation of high molecular weight impurities and inorganic salts. These impurities pose a manufacturing risk during the filtration of a monomer mix for making hydrophilic contact lenses containing same by slowing down the filtering process considerably; and, as a result, premature curing, i.e., polymerization, of the monomer mix commences before the monomer mix is introduced to the mold.

Premature curing (polymerization) of monomer materials is undesirable as it renders the monomer mix unsuitable for preparing the desired final product, e.g. contact lenses, and can cause clogging of machines used to make such products. In particular, when the monomer mix starts to polymerize prematurely it slowly forms a gel, typically from the bottom of the vessel upwards. Some monomer mixtures, however, auto-accelerate and can react quite violently.

Therefore, there is still a need for an improved commercial scale synthetic process for providing a high purity functionalized block copolymers, such as PLURONIC F-127 DM.

SUMMARY OF THE INVENTION

This invention describes a new synthetic method of forming free radical polymerizable end terminal functionalized poloxamers and poloxamines in commercial scale batches which uses a binary system of inhibitors to eliminate the formation of high molecular weight impurities. It has also been surprisingly discovered that the inorganic impurities formed during the commercial scale synthetic process are removed by the use of resin materials.

To minimize the high molecular weight impurities previously formed during the commercial scale synthesis of poloxamer 407 DM and to develop different binary systems of inhibitors to avoid these high molecular impurities during the synthesis of poloxamer 407 DM, a novel commercial scale synthetic process is disclosed herein.

Disclosed herein is a method comprising reacting a poloxamer or poloxamine compound with a first methacrylating agent in the presence of a solvent stabilized with a first free radical inhibitor to form a first reaction product, and further reacting the first reaction product with an organic base and a second methacrylating agent stabilized with a second free radical inhibitor to form a second reaction product, wherein the first free radical inhibitor is a different compound than the second free radical inhibitor.

BRIEF DESCRIPTION OF THE FIGURES

FIG. 2 to FIG. 9 are HPLC chromatograms showing the calculations of the product of Example 1;

FIG. 10 to FIG. 13 are GC chromatograms showing the calculations of the product of Example 1;

FIG. 15 is the GPC chromatogram of the product of Example 1;

FIG. 17 to FIG. 24 are HPLC chromatograms showing the calculations of the product of Comparative Example 1 when the reaction is performed without using any inhibitor;

FIG. 25 to FIG. 29 are GC chromatograms showing the calculations of the product of Comparative Example 1 when the reaction is performed without using any inhibitor;

FIG. 31 is the GPC chromatogram of the product of Comparative Example 1 when the reaction is performed without using any inhibitor;

FIG. 33 to FIG. 39 are HPLC chromatograms showing the calculations of the batch FS-09903-070 when the reaction is performed using BHT and MEHQ as inhibitors for the optimized improved large scale synthesis of Poloxamer 407DM of Example 3;

FIG. 42 and FIG. 43 are GPC chromatograms of the batch FS-09903-070 when the reaction is performed using BHT and MEHQ as inhibitors for the optimized improved large scale synthesis of Poloxamer 407DM of Example 3. There is no detectable high molecular weight impurity.

DETAILED DESCRIPTION OF THE PREFERRED EMBODIMENTS

Figure 1:
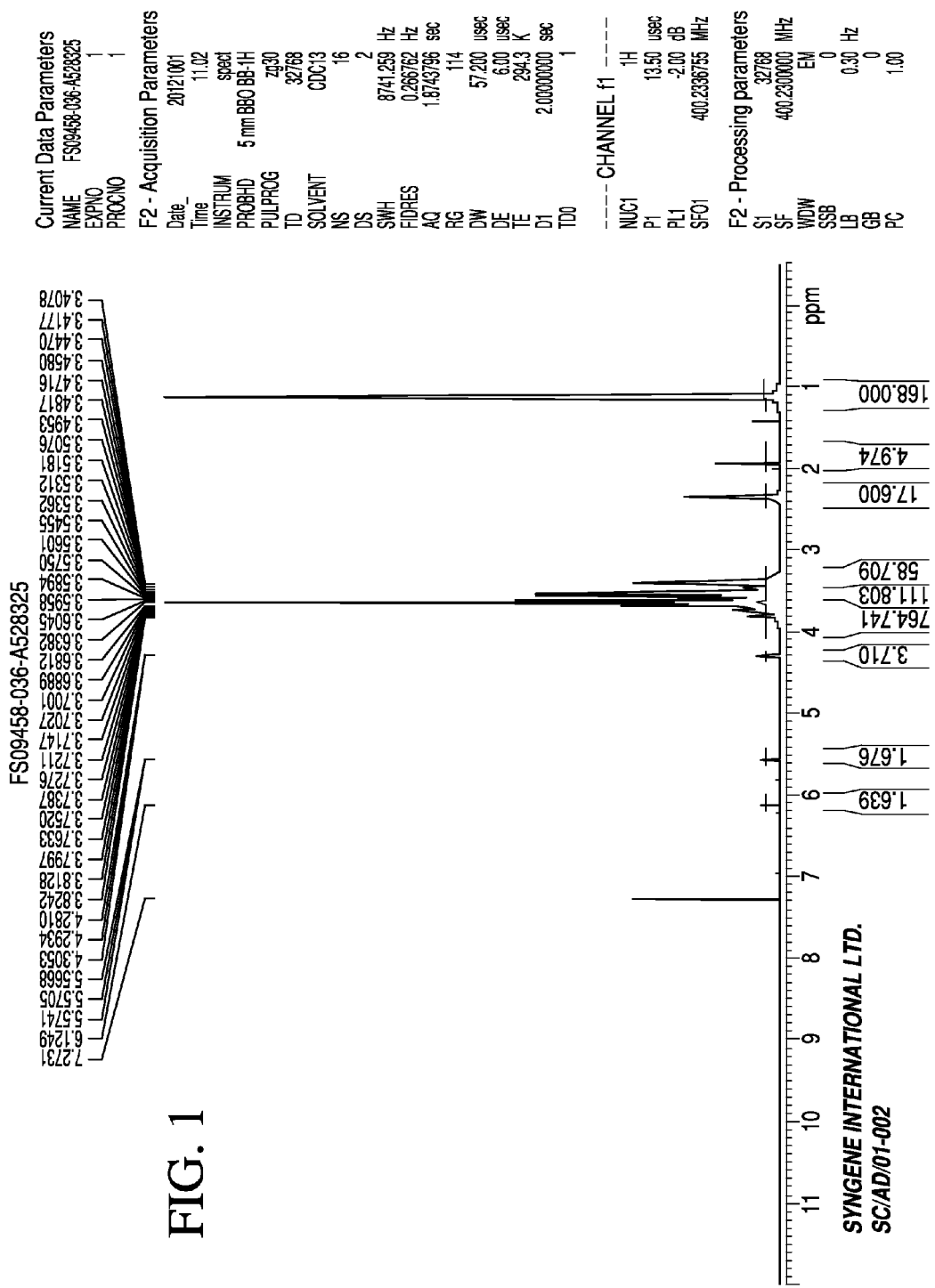
FIG. 1 is the NMR Spectrum of the product of Example 1.
Figure 10:
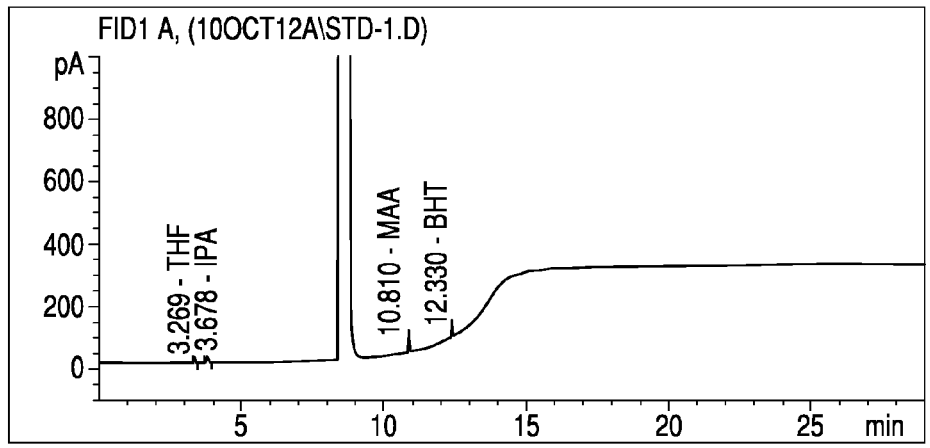
Figure 11:
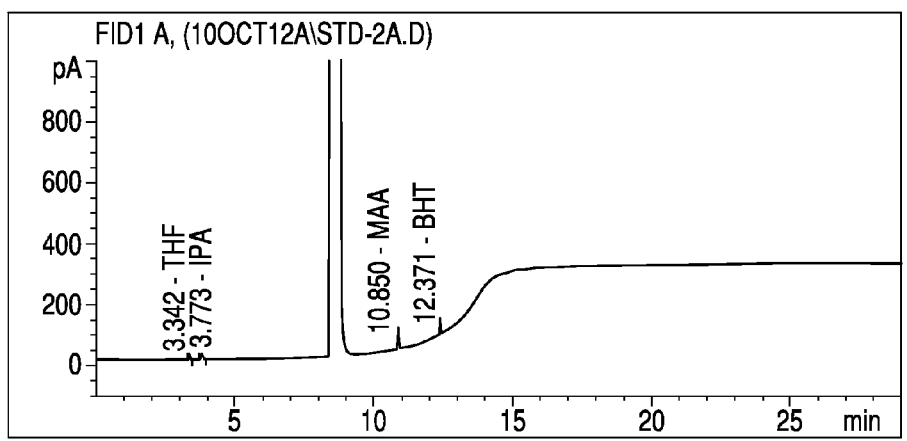

A poloxamer or poloxamine compound is reacted with a first methacrylating agent in the presence of a solvent stabilized with a first free radical inhibitor to form a first reaction product, and the first reaction product is further reacted with an organic base and a second methacrylating agent stabilized with a second free radical inhibitor to form a second reaction product, wherein the first free radical inhibitor is a different compound than the second free radical inhibitor. In various embodiments of the inventions, the first and second methacrylating agents may be the same, or may be different. In a specific embodiment, the first and second methacrylating agent is methacryloyl chloride. In embodiments wherein the poloxamer or poloxamine compound is a poloxamer compound, the first reaction product may be a monomethacrylated poloxamer compound, and the second reaction product may be a dimethacrylated poloxamer compound. In embodiments wherein the poloxamer or poloxamine compound is a poloxamine compound, the first reaction product may be a monomethacrylated poloxamine compound, and the second reaction product may be a polymethacrylated (e.g., di-, tri-, or tetra-methacrylated) poloxamine compound. The poloxamer or poloxamine compound may be reacted with the first methacrylating agent in the presence of the organic base, or the organic base may be added to the first reaction product after reaction thereof.

PEO- and PPO-containing block copolymers are presently preferred. One such copolymer that can be used with the method of the invention, is PLURONIC® F127, a block copolymer having the structure [(polyethylene oxide)$_{99}$-(polypropylene oxide)$_{66}$-(polyethylene oxide)$_{99}$]. The terminal hydroxyl groups of the copolymer are functionalized with free radical polymerizable ethylenically unsaturated end groups to allow for the reaction of the PEO- and PPO-containing block copolymer with other device forming monomers.

A poloxamer compound such as PLURONIC F 127 is reacted with a methacrylating agent such as methacryloyl chloride while blanketed with nitrogen gas in the presence of a solvent such as anhydrous tetrahydrofuran (THF) stabilized with a free radical inhibitor such as 2,6 di tert-butyl-4-methyl phenol (BHT). After this portion of the synthesis has reacted, an organic base such as triethylamine (TEA) is added to the above solution with continued mixing. Alternatively, the organic base may be present during the first methacrylation reaction. To this reaction mixture is then added methacryloyl chloride which was stabilized with Hydroquinone monomethyl ether (MEHQ) with continued stirring under nitrogen gas. After the immediately above reaction has gone to completion the reaction mass is allowed to cool to room temperature (RT) and worked up to give the functionalized desired product as shown in the Reaction Scheme-1.

Reaction Scheme 1:

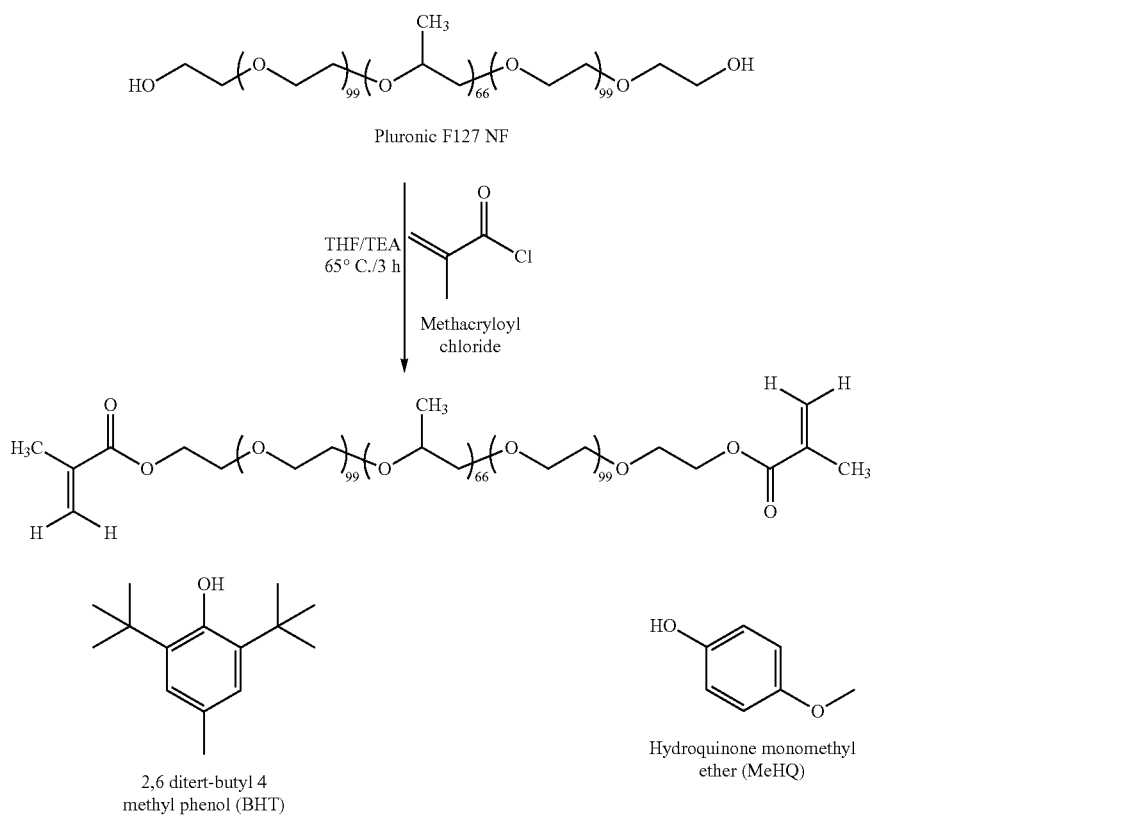

Turbidity measurements of PLURONIC F-127DM both in water and tetrahydrofuran were determined to be indicative of the presence of inorganic salts and any high molecular weight impurities. For the purpose of collecting the analytical data and to determine the desired product purity, dimethacrylation % conversion was checked by NMR & HPLC; GPC was used to determine the Mw and Mn molecular weights and GC was used to determine the residual solvents and methacrylic acid.

It is believed the formation of High Molecular Weight impurities in PLURONIC F-127DM is due to the inadvertent cross linking caused by the presence of undesirable radicals. The radicals formed in PLURONIC F-127DM chains can further react to form gel or High Molecular Weight impurities. This can be avoided by adding BHT as a free radical inhibitor. Any undesirable radical formed will react with BHT and result in a stabilized radical unable to react further thus avoiding gel formation. The two electron donating groups (t-butyl) in BHT also serve to activate the end terminal hydroxyl groups of the PEO-PPO containing block copolymer resulting in an increase of the efficiency of the inventive reaction.

Although not entirely certain, the inventors believe the efficacy of BHT is limited to suppression of radicals formed at only the propylene oxide repeating units of Poloxamer block copolymer. The reason for this limitation could be due to the sterically hindered stabilized radicals formed from BHT. It has surprisingly been discovered that the usage of a combination of MEHQ with BHT in the synthetic scheme of the invention herein can effectively stabilize the radicals formed at both the ethylene oxide and propylene oxide units of the poloxamer block copolymer.

Further, the radicals which are generated in the reaction medium due to use of highly polar solvents like THF at large scale reaction conditions are effectively stabilized by use of these two inhibitors.

Mechanism (Action of Inhibitor): Usage of BHT

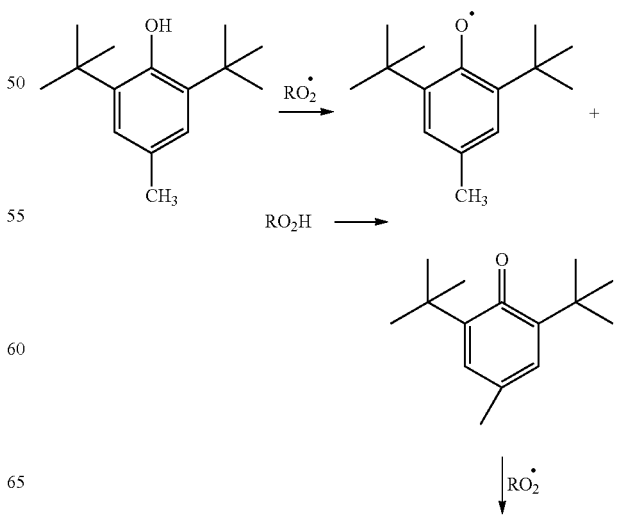

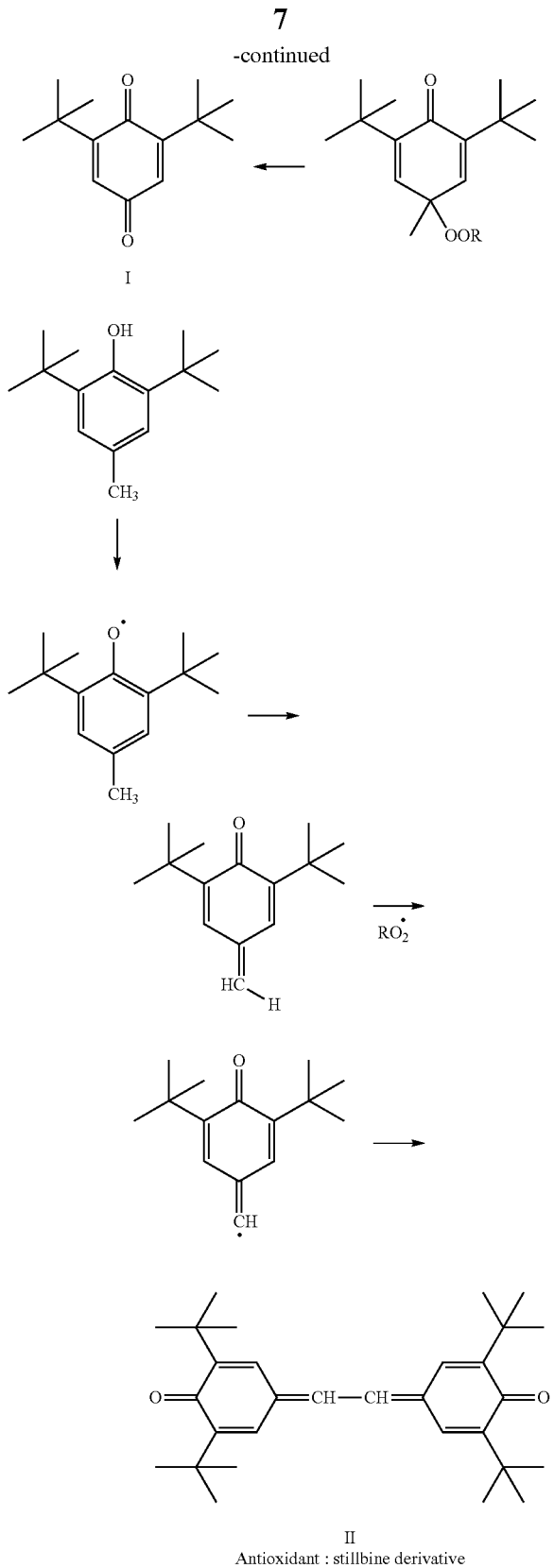

Antioxidant : stillbine derivative

Effective oxidation of BHT gives rise to mixture of compound which are called quinoid compounds. 3,5,3',5'-tetra-tert-butylstilbiene-4,4'-quinone and 2,6-ditert-butyl-1,4-benzoquinone.

EXAMPLES

Example 1

Modified Process for Manufacturing of Poloxamer 407 DM (FS09458-036): with Single Inhibitor System (BHT as an Inhibitor)

Observations: When 2,6 ditert-butyl 4 methyl phenol (BHT) was used as an inhibitor, the High Molecular Weight component was minimized and the Turbidity of the product in THF and Water was very much reduced.

Typical Procedure: 500 g of PLURONIC F-127 was placed in a round bottom flask fitted with reflex condenser and the reaction was blanketed with nitrogen gas Anhydrous tetrahydrofuran (THF; 3500 mL) stabilized with 5250 mg of 2,6 ditert-butyl-4-methyl phenol (BHT) was added to the flask and heated to 30° C. under stirring till it formed a clear solution. 68 mL of triethylamine (TEA) was added to the above solution and the stirring continued. To this was added drop wise 47.5 mL of freshly distilled methacryloyl chloride at 30-32° C. through an addition funnel. The reaction mixture was heated to 63° C. upon stirring with nitrogen gas for 3 hours. Then the reaction mass was cooled for 12 h at RT.

Work Up: The Precipitated salt (TEA-HCl) was filtered from the reaction mixture and the filtrate was treated with 250 g of Basic alumina under stirring for 30 minutes and filtered. The filtrate was treated with 250 g of basic resin (PUROLITE) under stirring for 30 minutes and filtered through celite bed. The filtrate was concentrated to remove 1165 mL of THF to get 2335 mL of mass. The mass was precipitated into 16000 mL of n-heptane. The precipitate was filtered and dried at 45° C. under high vacuum.

Analytical Characterization

% Conversion by $^1$H-NMR:

1H-NMR spectrum of FS09458-036 was recorded in DMSO-d6 on a Bruker Avance 400 MHz. The conversion was 82.3% (FIG. 1)

Calculation:

No. of protons at 6.1 ppm 1.63+No. of protons at 5.6 ppm 1.67/4=3.3/4×100=82.3%

Conversion by HPLC: Determination of Poloxamer 407 Dimethacrylate (FS09458-036): The HPLC analysis was performed Agilent 1200 series HPLC system with SHODEX KB-804 (300× 8) mm column a using SODIUM ACETATE BUFFER as Mobile Phase.

Calculation: % Conversion by HPLC (FIG. 2 to FIG. 9)

TABLE 1

Product: Poloxamer 407 Dimethacrylate
Study: % Conversion (By HPLC)
B. No.: FS09458-036
AR No.: A529453
Check standard weight (mg) = 203.4
Standard weight (mg) = 198.0
% Conversion for standard = 84.7

|  | Peak-1 | Peak-2 | Total peak area |
|---|---|---|---|
| Check standard | 2350798 | 1555236 | 3906034 |
| Standard | 2226408 | 1329009 | 3555417 |
| % Agreement |  |  | 106.94 |

TABLE 1-continued

Product: Poloxamer 407 Dimethacrylate
Study: % Conversion (By HPLC)
B. No.: FS09458-036
AR No.: A529453
Check standard weight (mg) = 203.4
Standard weight (mg) = 198.0
% Conversion for standard = 84.7

System precision:

| S. No. | Peak-1 | Peak-2 | Total peak area |
|---|---|---|---|
| 1 | 2226408 | 1329009 | 3555417 |
| 2 | 2329288 | 1391799 | 3721087 |
| 3 | 2329679 | 1444988 | 3774667 |
| 4 | 2315375 | 1467507 | 3782882 |
| 5 | 2286721 | 1361211 | 3647932 |
| 6 | 2297159 | 1503218 | 3800377 |
| Average | 2297438.3 | 1416288.7 | 3713727.0 |
| Std. Dev | 38822.245 | 66715.38316 | 95340.99627 |
| % RSD | 1.69 | 4.71 | 2.57 |

% Conversion

| S. No. | Sample weight (g) | Peak-1 | Peak-2 | Total peak area | % Conversion |
|---|---|---|---|---|---|
| 1 | 198.9 | 2593651 | 1595599 | 4189250.0 | 95.11 |
| 2 | 199.0 | 2614811 | 1693300 | 4308111.0 | 97.76 |
| Average | | 2604231.00 | 1644449.50 | 4248680.50 | 96.44 |
| Std.Dev | | 14962.38 | 69085.04 | 84047.42 | 1.87 |
| % RSD | | 0.57 | 4.2 | 1.98 | 1.94 |

$$\% \text{ Conversion} = \frac{\text{Total sample area} \times \text{standard weight (mg)} \times \% \text{ Conversion of the standard}}{\text{Average total standard area} \times \text{Sample weight (mg)}}$$

GC analysis was performed using Agilent GC 6890N series equipped with G188 Head space Auto sampler. Nitrogen was the carrier gas with flame ionized detector.

GC Calculation (FIG. 10 to FIG. 13):

TABLE 2

RESIDUAL MONOMER REPORT
Product: Poloxamer
Batch No.: FS09458-036
A.R. No.: A529453

System suitability:

| S. No. | Monomer | Wt. |
|---|---|---|
| 1 | THF | 0.0923 |
| 2 | IPA | 0.102 |
| 3 | MAA | 0.2198 |
| 4 | BHT | 0.092 |

| | THF | IPA | MAA | BHT |
|---|---|---|---|---|
| STD-1 | 78.607 | 81.421 | 168.016 | 134.286 |
| STD-2 | 79.75 | 80.485 | 164.034 | 133.905 |
| STD-3 | 77.716 | 77.771 | 172.812 | 127.356 |
| Average | 78.691 | 79.89233333 | 168.2873333 | 131.849 |
| Std. Dev | 1.02 | 1.90 | 4.40 | 3.90 |
| % RSD | 1.30 | 2.37 | 2.61 | 2.95 |

| | Area of | | % Residual | | |
|---|---|---|---|---|---|
| Monomer | Test sample-1 | Test sample-2 | Test sample-1 | Test sample-2 | Total Residual |
| THF | N.D | N.D | N.D | N.D | N.D |
| IPA | N.D | N.D | N.D | N.D | N.D |
| MAA | N.D | N.D | N.D | N.D | N.D |
| BHT | 71.403 | 73.102 | 0.271365585 | 0.277822599 | 0.274594 |

Sample weight (g) = 0.0918

Figure 14:
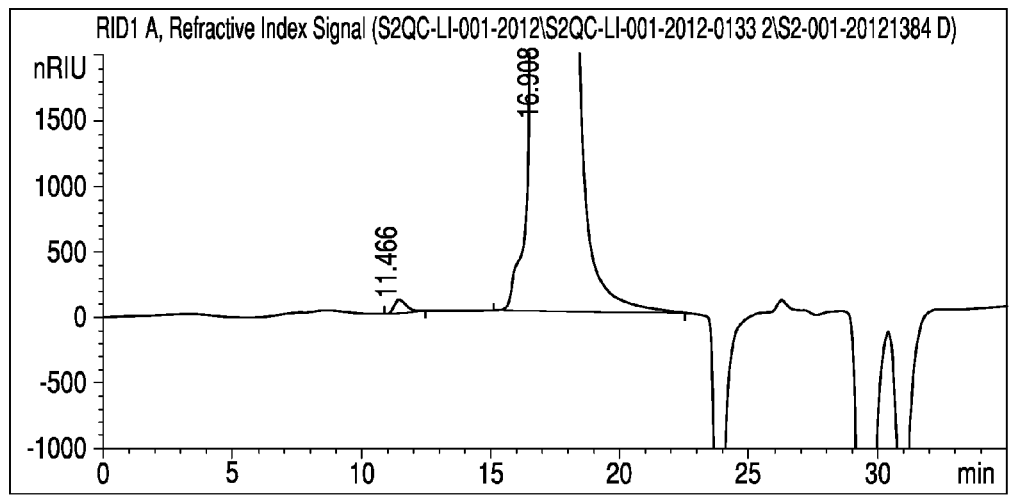
FIG. 14 is the HPLC chromatogram showing the high molecular weight component identification of the product of Example 1.

High Molecular Component was identified using HPLC System: Chromatogram is given below. It is found that HMW component is 0.35% was present in this sample (FIG. 14).

GPC:

GPC of FS-09458-036 was performed using Agilent 1200 Series with Addon GPC software. PEG-PPg was used as the GPC standards (FIG. 15).

Turbidity measurement of the Poloxamer 407 DM was measured in NTU units using HF Scientific Turbidity meter (Make): Model-Micro 100 Turbid meter. Solution was prepared in 10% water and THF. The turbidity was measured in water (3 NTU) and in THF (6 NTU).

Methacrylic acid content: Titration method was followed.

Comparative Example 1

Old Process for Manufacturing of Poloxamer 407 DM: without any Inhibitor

Observations: High Molecular Weight component was observed and the Turbidity of the product in THF and Water was very much high.

Typical Procedure:

500 g of PLURONIC F-127 was placed in a round bottom flask fitted with reflex condenser and the reaction was blanketed with nitrogen gas Anhydrous tetrahydrofuran (THF; 3500 mL was added to the flask and heated to 30° C. under stirring till it formed a clear solution. 68 mL of triethylamine (TEA) was added to the above solution and the stirring continued. To this was added drop wise 47.5 mL of methacryloyl chloride which at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 250 g of Basic alumina under stirring for 30 minutes and filtered. The filtrate was concentrated to remove 1165 mL of THF to get 2335 mL of mass. The mass was precipitated into 16000 mL of n-heptane. The precipitate was filtered and dried at 45° C. under high vacuum.

Analytical Characterization

Figure 16:
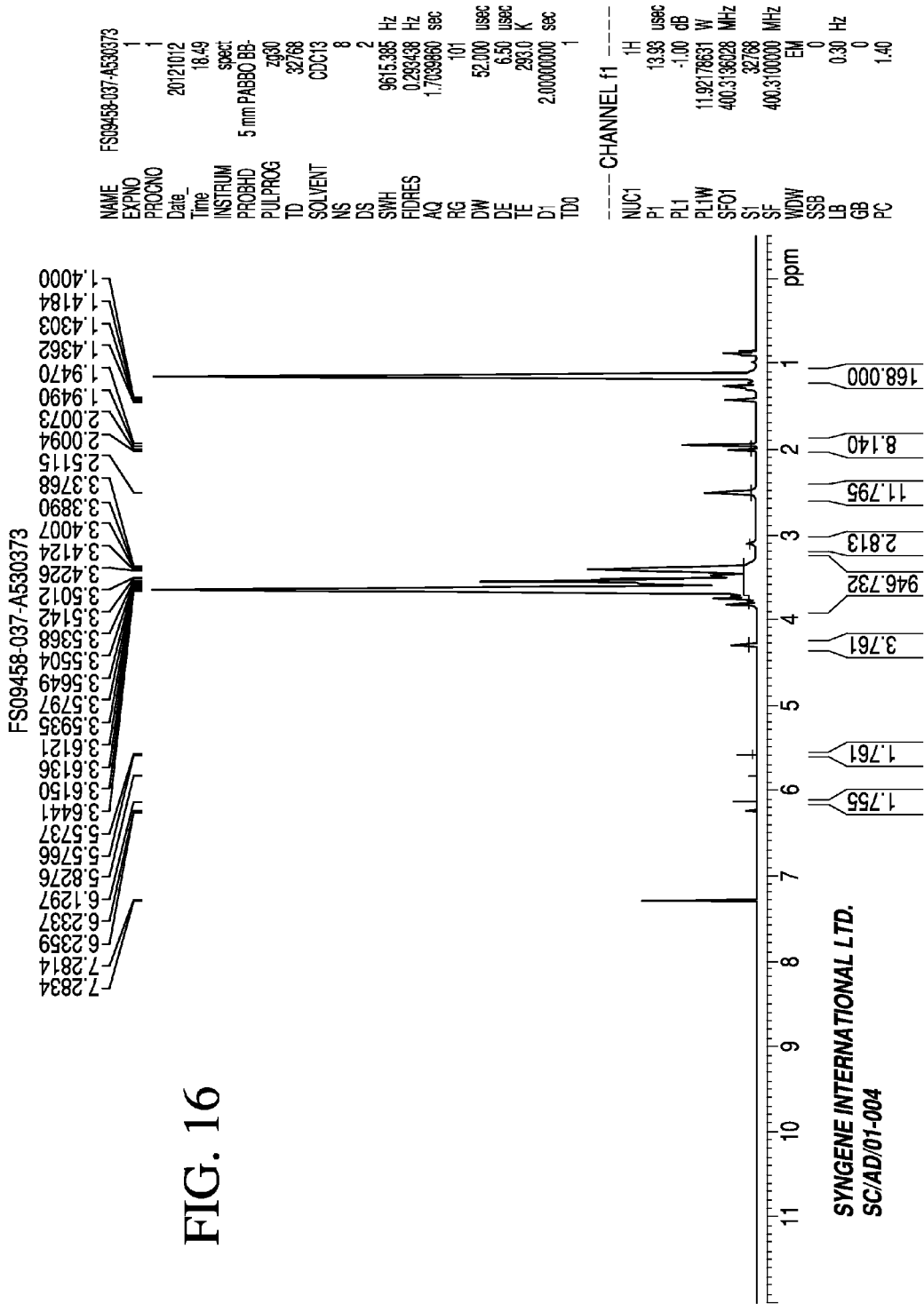
FIG. 16 is the NMR Spectrum of the product of Comparative Example 1 when the reaction is performed without using any inhibitor.
Figure 25:
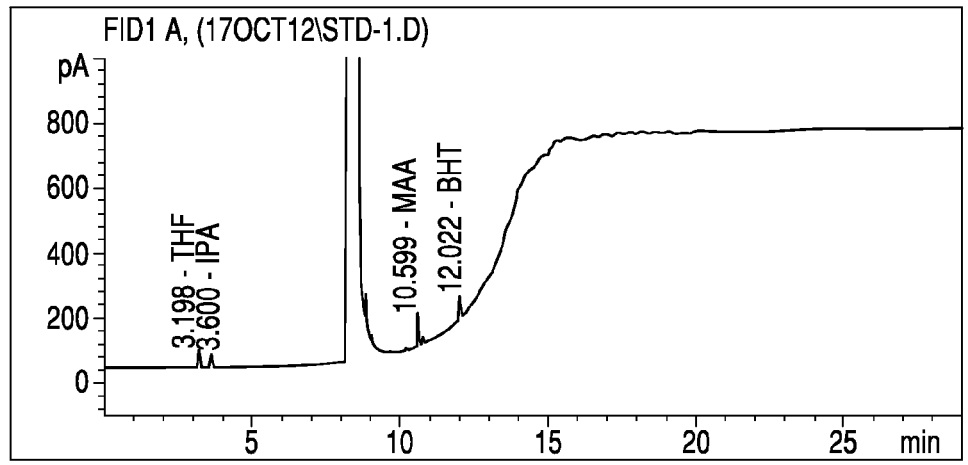
Figure 27:
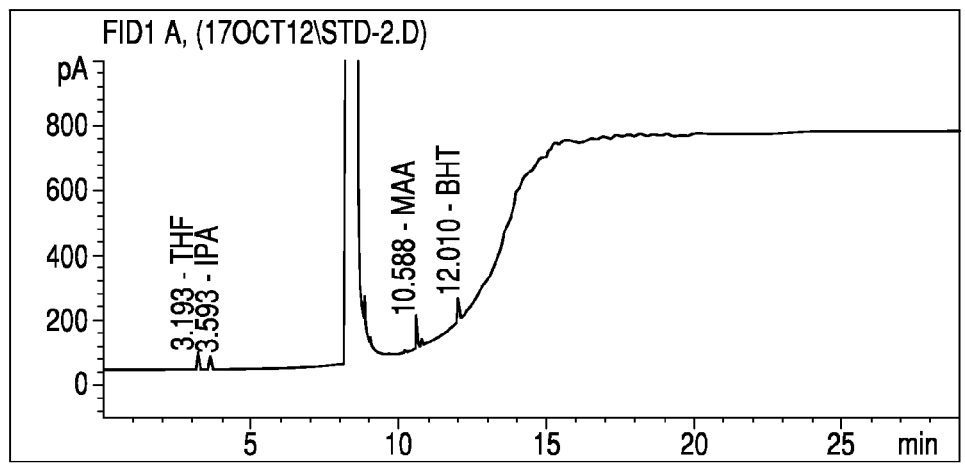
Figure 28:
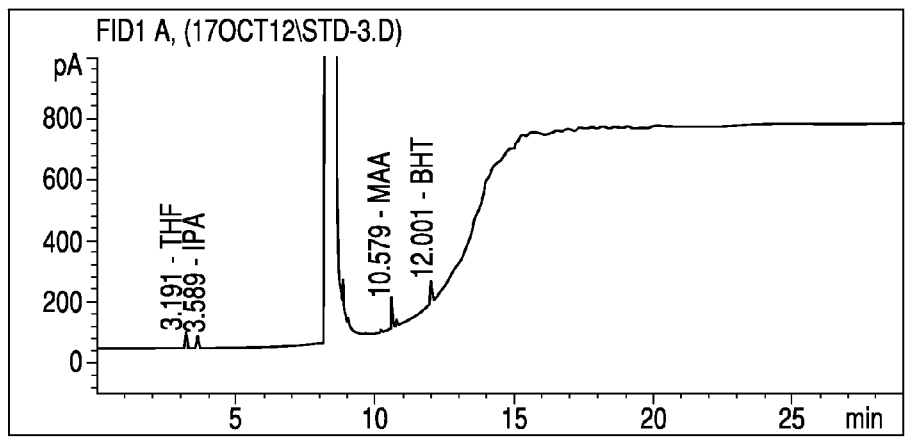
Figure 29:
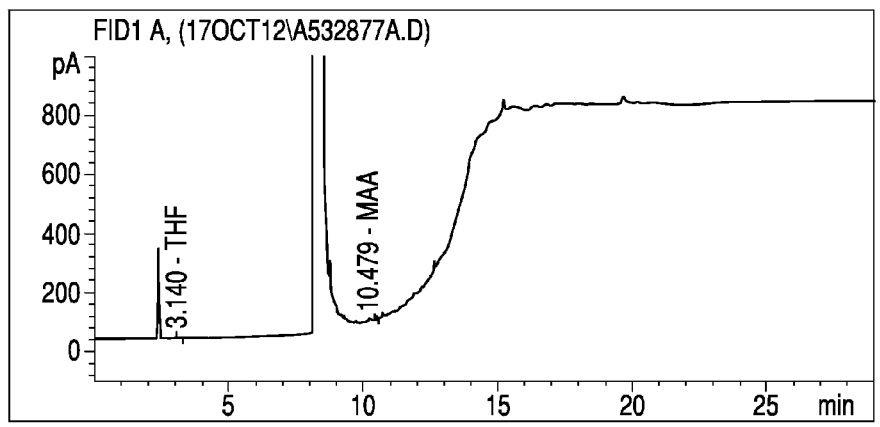

% Conversion by $^1$H-NMR:

1H-NMR spectrum of FS-09458-037 was recorded in DMSO-d6 on a Bruker Avance 400 MHz. The conversion was 87.7%. Calculation: No. of protons at 6.1 ppm 1.75+No. of protons at 5.6 ppm 1.76=3.51/4×100=87.7 (FIG. 16)

% Conversion by HPLC: Determination of Poloxamer 407 Dimethacrylate:

The HPLC analysis of FS-09458-037 was performed using Agilent 1200 series HPLC system with SHODEX KB-804 (300×8) mm column a using SODIUM ACETATE BUFFER as Mobile Phase.

Calculation: % Conversion by HPLC (FIG. 17 to FIG. 24)

TABLE 3

Product: Poloxamer 407 Dimethacrylate
Study: % Conversion (By HPLC)
B. No.: FS09458-037
AR No.: A532877
Check standard weight (mg) = 202.1
Standard weight (mg) = 199.2
% Conversion for standard = 84.7

|  | Peak-1 | Peak-2 | Total peak area |
|---|---|---|---|
| Check standard | 2243804 | 1652655 | 3896459 |
| Standard | 2242333 | 1744509 | 3986842 |
| % Agreement |  |  | 96.33 |

System precision:

| S. No. | Peak-1 | Peak-2 | Total peak area |
|---|---|---|---|
| 1 | 2242333 | 1744509 | 3986842 |
| 2 | 2184706 | 1632958 | 3817664 |
| 3 | 2156436 | 1714115 | 3870551 |
| 4 | 2176410 | 1687458 | 3863868 |
| 5 | 2159765 | 1581961 | 3741726 |
| 6 | 2107640 | 1637102 | 3744742 |
| Average | 2171215.0 | 1666350.5 | 3837565.5 |
| Std. Dev | 43950.124 | 59879.62368 | 91935.65117 |
| % RSD | 2.02 | 3.59 | 2.4 |

% Conversion

| S. No. | Sample weight (g) | Peak-1 | Peak-2 | Total peak area | % Conversion |
|---|---|---|---|---|---|
| 1 | 198.2 | 2234443 | 1709801 | 3944244.0 | 87.49 |
| 2 | 199.4 | 2213491 | 1619436 | 3832927.0 | 84.51 |
| Average |  | 2223967.00 | 1664618.50 | 3888585.5 | 86.00 |

$$\% \text{ Conversion} = \frac{\text{Total sample area} \times \text{standard weight (mg)} \times \% \text{ Conversion of the standard}}{\text{Average total standard area} \times \text{Sample weight (mg)}}$$

GC analysis was performed using Agilent GC 6890N series equipped with G188 Head space Auto sampler. Nitrogen was the carrier gas with flame ionized detector.
GC Calculation (FIG. 25 to FIG. 29):

TABLE 4

RESIDUAL MONOMER REPORT
Product: Poloxamer
Batch No.: FS09458-037
A.R. No.: A532877

System suitability:

| S. No. | Monomer | Wt. |
|---|---|---|
| 1 | THF | 0.1142 |
| 2 | IPA | 0.1146 |
| 3 | MAA | 0.2013 |
| 4 | BHT | 0.0923 |

|  | THF | IPA | MAA | BHT |
|---|---|---|---|---|
| STD-1 | 96.264 | 85.868 | 139.706 | 119.094 |
| STD-2 | 98.787 | 86.458 | 145.900 | 123.176 |
| STD-3 | 97.908 | 86.339 | 142.939 | 128.183 |
| Average | 97.653 | 86.399 | 142.848 | 123.484 |
| Std. Dev | 1.28 | 0.08 | 3.10 | 4.55 |
| % RSD | 1.31 | 0.10 | 2.17 | 3.69 |

|  | Area of | | % Residual | | |
|---|---|---|---|---|---|
| Monomer | Test sample-1 | Test sample-2 | Test sample-1 | Test sample-2 | Result |
| THF | 10.626 | 10.825 | 0.0631 | 0.0643 | 0.0637 |
| IPA | N.D | N.D | N.D | N.D | N.D |
| MAA | 16.737 | 17.311 | 0.1198 | 0.1240 | 0.1219 |
| BHT | N.D | N.D | N.D | N.D | N.D |
| Total Residual solvent (%) |  |  | 0.1830 | 0.1883 | 0.19 |

Sample weight (g) = 0.0984

Figure 30:
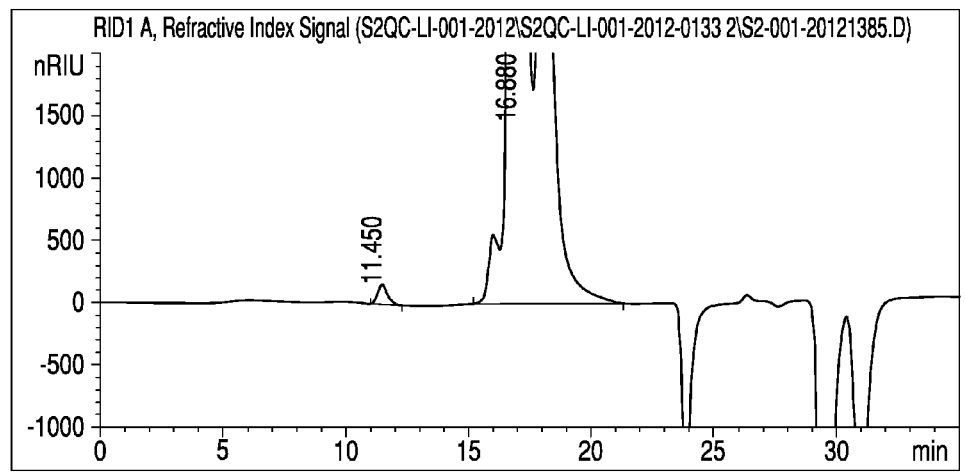
FIG. 30 is the HPLC chromatogram showing the high molecular weight component identification of the product of Comparative Example 1 when the reaction is performed without using any inhibitor.

High Molecular Component was Identified Using HPLC System:
Chromatogram is given below. It is found that HMW component is 0.55% was present in this sample (FIG. 30).
Turbidity measurement of the Poloxamer 407 DM was measured in NTU units using HF Scientific Turbidity meter (Make): Model-Micro 100 Turbid meter. Solution was prepared in 10% water and THF. The turbidity in water showed 5 NTU and in THF 200 NTU.
GPC:
GPC was performed using Agilent 1200 Series with Addon GPC software. PEG-PPg were used as the GPC standards (FIG. 31).
Methacrylic Acid Content:
Titration method was followed. The Methacrylic acid content: 0.002% (for this sample).

TABLE 5

Reaction performed using BHT as an inhibitor for the synthesis of Poloxamer 407 DM
Compilation of Poloxamer 407 DM with different concentrations of BHT

| SL. No | Batch. No | Batch size (g) | BHT used for process (ppm) | THF grade | % conversion by NMR | % conversion by HPLC | BHT level by GC method (ppm) | GPC % of HMW | Turbidity In THF (NTU) | Yield (g) |
|---|---|---|---|---|---|---|---|---|---|---|
| SET-1 | | | | | | | | | | |
| 1 | FS09458-032 | 500 | 0 | Dry | 80 | 99.8 | 0 | 0.3 | 25.1 | 455 |
| 2 | FS09458-033 | 500 | 500 | Dry | 83.5 | 92.3 | 10 | 0.2 | 125 | 460 |
| 3 | FS09458-036 | 500 | 1500 | Dry | 85.77 | 96.4 | 40 | 0.4 | 10 | 455 |
| 4 | FS09458-035 | 500 | 0 | Commercial | 85.0 | 94.4 | 5 | 0.1 | 57.4 | 460 |
| SET-2 | | | | | | | | | | |
| 1 | FS09458-037 | 500 | 0 | Dry | 83.6 | 86 | 0 | 0.6 | 340 | 465 |
| 2 | FS09458-038 | 500 | 500 | Dry | 81.7 | 87.1 | 15 | 0.8 | 50 | 460 |
| 3 | FS09458-040 | 500 | 1500 | Dry | 81.9 | 93.01 | 60 | 0.7 | 12.7 | 470 |
| 4 | FS09458-039 | 500 | 0 | Commercial | 85.6 | 89.7 | 10 | 0.4 | 500 | 475 |

TABLE 5-continued

Reaction performed using BHT as an inhibitor for the synthesis of Poloxamer 407 DM
Compilation of Poloxamer 407 DM with different concentrations of BHT

| SL. No | Batch. No | Batch size (g) | BHT used for process (ppm) | THF grade | % conversion by NMR | % conversion by HPLC | BHT level by GC method (ppm) | GPC % of HMW | Turbidity In THF (NTU) | Yield (g) |
|---|---|---|---|---|---|---|---|---|---|---|
| | | | | SET-3 | | | | | | |
| 1 | FS09458-042 | 500 | 0 | Dry | 80.7 | 89.5 | 0 | 1.3 | 410 | 470 |
| 2 | FS09458-043 | 500 | 500 | Dry | 80.7 | 84.3 | 10 | 0.6 | 832 | 475 |
| 3 | FS09458-041 | 500 | 1500 | Dry | 82.4 | 92.5 | 120 | 0.5 | 22 | 475 |
| 4 | FS09458-044 | 500 | 0 | Commercial | 83 | 88.8 | 0 | 0.6 | 82.3 | 470 |

Advantage of BHT:

The formation of undesirable High MW contaminant is minimized and inhibitor is not carried over with the reaction product when used as part of a device forming monomer mix.

Disadvantage of BHT:

Did not completely stop the formation of the High MW contaminant.

Limitations of BHT:

Because BHT radical is stable & its sterically hindered this cannot further react with the radicals The activity of BHT radical is limited which cannot alone stop the formation of high molecular weight impurities, combination of inhibitor system was performed. The new inhibitor is MEHQ.

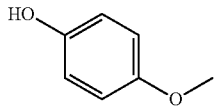

Hydroquinone monomethyl ether

Mechanism (Action of Inhibitor): Usage of MEHQ

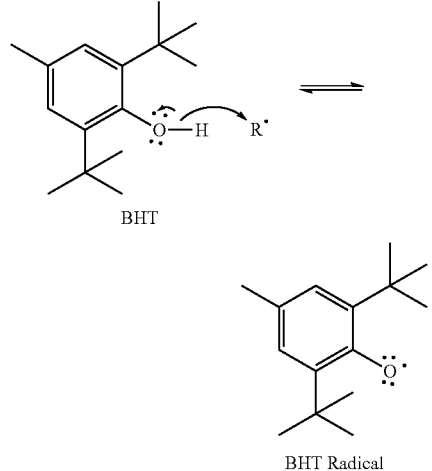

BHT

BHT Radical

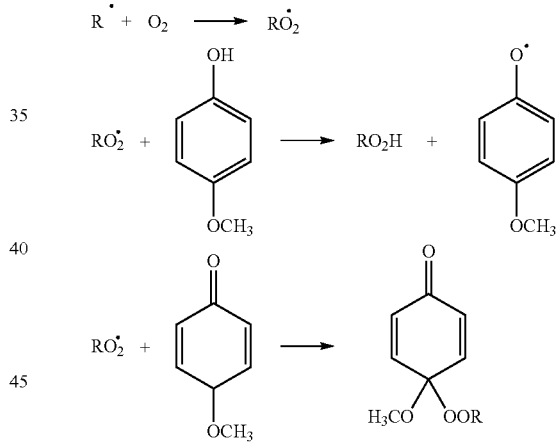

TABLE 6

Reaction performed using BHT &MEHQ as inhibitors for the synthesis of Poloxamer 407 DM.

| SL. No | Descrip'n | Batch No. | Inhibitor MeHQ | BHT | GPC % HMW | GPC % HMW | NMR | GPC % HMW |
|---|---|---|---|---|---|---|---|---|
| 1 | Set-1 | FS09903-023 | 1000 ppm | 0 | ND | ND | 72.5 | ND |
| 2 | | FS09903-024 | | 500 | ND | ND | 66 | ND |
| 3 | | FS09903-025 | | 1000 | ND | ND | 71.25 | ND |
| 4 | | FS09903-026 | | 1500 | ND | ND | 73.75 | ND |
| 1 | Set-2 | FS09903-030 | 2000 ppm | 0 | ... | ... | 87.5 | ND |
| 2 | | FS09903-031 | | 500 | 0.06 | 0.03 | 83.5 | 0.09 |
| 3 | | FS09903-032 | | 1000 | 0.04 | ND | 75.25 | ND |
| 4 | | FS09903-033 | | 1500 | ND | ... | 67.5 | ND |
| 1 | Set-3 | FS09903-034 | 3000 ppm | 0 | ND | ND | 93 | 0.04 |
| 2 | | FS09903-035 | | 500 | ND | ND | 92 | ND |
| 3 | | FS09903-036 | | 1000 | ND | ND | 81 | ND |
| 4 | | FS09903-037 | | 1500 | ND | 0.06 | 95 | ND |

TABLE 6-continued

Reaction performed using BHT &MEHQ as inhibitors for the synthesis of Poloxamer 407 DM.

| SL. No | Descrip'n | Batch No. | Inhibitor MeHQ | BHT | GPC % HMW | GPC % HMW | NMR | GPC % HMW |
|---|---|---|---|---|---|---|---|---|
| 1 | Set-4 | FS09903-038 | 4000 ppm | 0 | ND | ND | 85 | ND |
| 2 | | FS09903-039 | | 500 | ... | ND | 73 | ND |
| 3 | | FS09903-040 | | 1000 | ND | ND | 61 | ND |
| 4 | | FS09903-041 | | 1500 | ND | ND | 79.25 | ND |
| 1 | Set-5 | FS09903-042 | 5000 ppm | 0 | ND | ... | 91 | ND |
| 2 | | FS09903-043 | | 500 | ND | ... | 95 | ND |
| 3 | | FS09903-044 | | 1000 | ND | ... | 89.7 | ND |
| 4 | | FS09903-045 | | 1500 | ND | ... | 94.5 | ND |

The usage of MEHQ along with BHT shown no High molecular weight impurity in Poloxamer 407 DM

TABLE 7

Comparative data: BHT &MEHQ as a inhibitors for the synthesis of Poloxamer 407 DM

| MEHQ level (ppm) | BHT | | | |
|---|---|---|---|---|
| | 0 ppm % of conversion | 500 ppm % of conversion | 1000 ppm % of conversion | 1500 ppm % of conversion |
| 1000 | 73 | 66 | 71 | 74 |
| 2000 | 88 | 84 | 75 | 68 |
| 3000 | 93 | 92 | 81 | 95 |
| 4000 | 84 | 73 | 61 | 79 |
| 5000 | 91 | 95 | 90 | 95 | stirring continued. To this was added drop wise 9.5 mL of freshly distilled methacryloyl chloride which was stabilized with 3000 ppm of Hydroquinone monomethyl ether (MEHQ) at 30-32° C. through an addition funnel. The reaction mixture was heated to 63° C. upon stirring with nitrogen gas for 3 hours. Then the reaction mass was cooled for 12 h at RT. The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove one third volume of THF. The mass was precipitated into 3200 mL of n-heptane. The precipitate was filtered and dried at 45° C. under high vacuum. The NMR analysis of the final polymer showed greater than 89% conversion.

TABLE 8

Reaction performed using BHT &MEHQ as a inhibitors for the synthesis of Poloxamer 407 DM

| | | % Conversion | | | GPC Main Peak Area | GPC HMW Peak Area | GPC % HMW | GC (ppm) | | | | Turbidity | Titration |
|---|---|---|---|---|---|---|---|---|---|---|---|---|---|
| Sl. No. | Batch No. | NMR | HPLC | Mw | Mn | (nRlu) | (nRlu) | (nRlu) | BHT + THF | MeHQ | n-Heptane | IPA | THF | MAA (%) |
| 1 | FS09903-010 | 94 | 92.29 | 8815 | 7224 | 682531.68 | ND | ND | ND | ND | ND | ND | 3.69 | 0.0051 |
| 2 | FS09903-011 | 91 | 90.58 | 8855 | 7447 | 805058.96 | 658.05 | 0.08 | ND | ND | 2779 | ND | Not done | 0.0034 |
| 3 | FS09903-015 | 96 | 87.98 | 8842 | 7447 | 732759.25 | ND | ND | ND | ND | 2323 | ND | 7.05 | 0.0085 |
| 4 | FS09903-016 | 87 | 94.59 | 8893 | 7461 | 799899.87 | ND | ND | ND | ND | ND | ND | Not done | 0.0032 |
| 5 | FS09903-017 | 92 | 92.16 | 8784 | 7362 | 790396.46 | ND | ND | ND | ND | ND | 1062 | Not done | 0.0034 |
| 6 | FS09903-018 | 92 | 93.31 | 8930 | 7443 | 805179.62 | ND | ND | ND | ND | ND | ND | 23.7 | 0.005 |
| 7 | FS09903-019 | 100 | 90.98 | 9033 | 7579 | 700435.68 | ND | ND | ND | ND | ND | ND | 8.76 | 0.0052 |
| 8 | FS09903-020 | 89 | 90.9 | 8930 | 7597 | 708862 | ND | ND | ND | ND | ND | ND | 29 | 0.0051 |

Example 2

Improved Synthesis of Functionalized Surfactants 100 g of PLURONIC F 127 was placed in a round bottom flask fitted with reflex condenser and the reaction was blanketed with nitrogen gas Anhydrous tetrahydrofuran (THF) (700 mL) stabilized with 1500 ppm of 2,6 di tert-butyl 4 methyl phenol (BHT) was added to the flask and heated to 30° C. under stirring till it formed a clear solution. 13.6 mL of triethylamine (TEA) was added to the above solution and the Example 3

Optimized Improved Large Scale Process for Manufacturing of Poloxamer 407 DM: with Double Inhibitor System (BHT and MeHQ as Inhibitors)

Observations: When 2,6 ditert-butyl 4 methyl phenol (BHT) & Hydroquinone monomethyl ether (MeHQ) was used as an inhibitor, the High Molecular Weight component was eliminated and the Turbidity of the product in THF and Water was drastically reduced

Typical Procedure:

1200 g of PLURONIC F-127 was placed in a round bottom flask fitted with reflex condenser and the reaction was blanketed with nitrogen gas Anhydrous tetrahydrofuran (THF; 8400 mL) stabilized with 12600 mg of 2,6 ditert-butyl 4 methyl phenol (BHT) was added to the flask and heated to 30° C. under stirring till it formed a clear solution. 163.2 mL of triethylamine (TEA) was added to the above solution and the stirring continued. To this was added drop wise 114 mL of freshly distilled methacryloyl chloride which was stabilized with 342 mg of Hydroquinone monomethyl ether (MeHQ) at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 600 g of Basic alumina under stirring for 30 minutes and filtered. The filtrate was treated with 600 g of basic resin (PUROLITE) under stirring for 30 minutes and filtered through celite bed. The filtrate was concentrated to remove 2800 mL of THF to get 5600 mL of mass. The mass was precipitated into 32000 mL of n-heptane. The precipitate was filtered and dried at 45° C. under high vacuum.

Analytical Characterization

Figure 32:
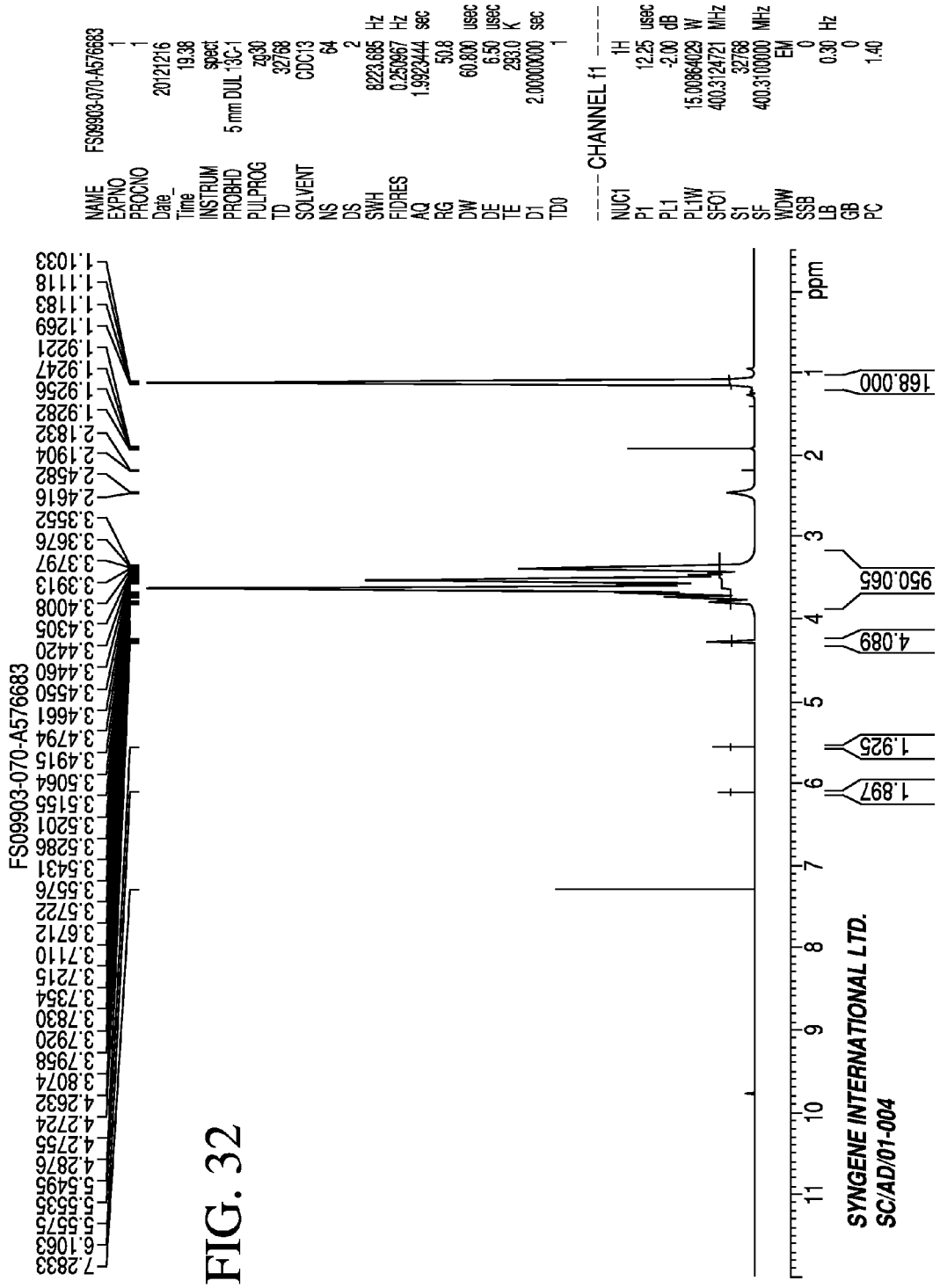
FIG. 32 is the NMR Spectrum of the batch FS-09903-070 when the reaction is performed using BHT and MEHQ as inhibitors for the optimized improved large scale synthesis of Poloxamer 407DM of Example 3.
Figure 34:
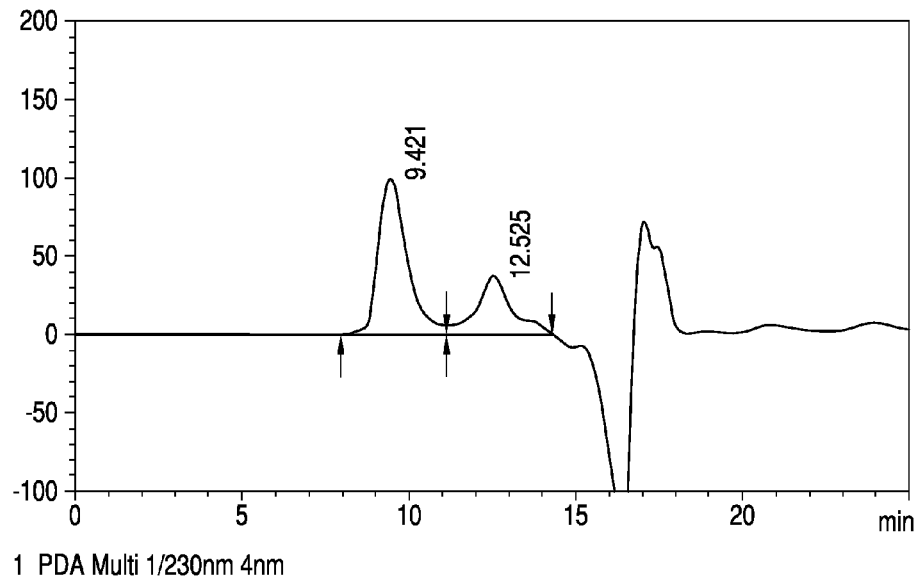
Figure 37:
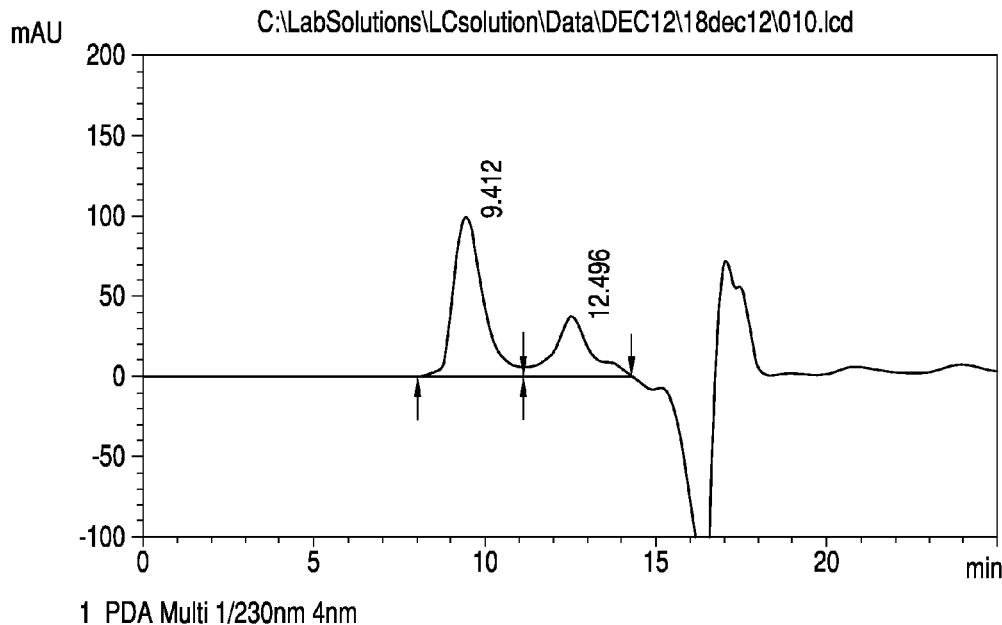
Figure 39:
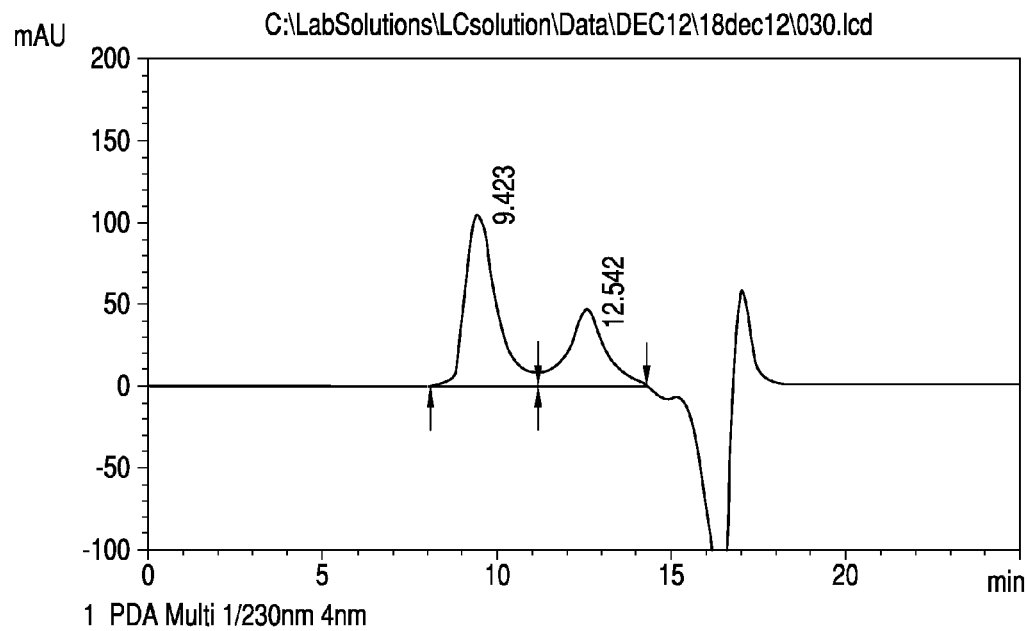

% Conversion by $^1$H-NMR:

1H-NMR spectrum of FS09903-070 was recorded in DMSO-d6 on a Bruker Avance 400 MHz. The conversion was 82.3% (FIG. 32). Calculation: No. of protons at 6.1 ppm 1.89+No. of protons at 5.6 ppm 1.92/4=3.81/4×100=95.2%

Conversion by HPLC: Determination of Poloxamer 407 Dimethacrylate (FS09903-070): The HPLC analysis was performed on Agilent 1200 series HPLC system with SHODEX KB-804 (300×8) mm column a using SODIUM ACETATE BUFFER as Mobile Phase.

Calculation: % conversion by HPLC (FIG. 33 to FIG. 39)

TABLE 9

Product: Poloxamer 407 Dimethacrylate
Study: % Conversion (By HPLC)
B. No.: FS09903-070
AR No.: A576683
Standard weight (mg) = 200.5
% Conversion for standard = 84.7

System precision:

| S. No. | Peak-1 | Peak-2 | Total peak area |
|---|---|---|---|
| 1 | 5941334 | 2720732 | 8662066 |
| 2 | 6069470 | 2866854 | 8936324 |
| 3 | 5992173 | 2775991 | 8768164 |
| 4 | 5989656 | 2704351 | 8694007 |
| 5 | 6070184 | 2792707 | 8862891 |
| 6 | 6069636 | 2822317 | 8891953 |
| Average | 6022075.5 | 2780492.0 | 8802567.5 |
| Std. Dev | 55293.83487 | 61230.54855 | 111560.8785 |
| % RSD | 0.92 | 2.2 | 1.27 |

% Conversion

| S. No. | Sample weight (mg) | Peak-1 | Peak-2 | Total peak area | % Conversion |
|---|---|---|---|---|---|
| 1 | 200.4 | 6389350 | 3407932 | 9797282.0 | 94.32 |
| 2 | 200.3 | 6407197 | 3519536 | 9926733.0 | 95.61 |
| Average | | 6398273.50 | 3463734.00 | 9862007.5 | 94.97 |

$$\% \text{ Conversion} = \frac{\text{Total sample area} \times \text{standard weight (mg)} \times \% \text{ Conversion of the standard}}{\text{Average total standard area} \times \text{Sample weight (mg)}}$$

GC analysis was performed using Agilent GC 6890N series equipped with G188 Head space Auto sampler. Nitrogen was the carrier gas with flame ionized detector.

TABLE 10

RESIDUAL MONOMER REPORT
Product Poloxamer
Batch No. FS09903-070
A.R.No. A576683

System suitability:

| S. No. | Monomer | Wt. |
|---|---|---|
| 1 | HEPTANE | 0.0218 |
| 2 | THF | 0.0187 |
| 3 | IPA | 0.0187 |
| 4 | MAA | 0.0186 |
| 4 | BHT | 0.0194 |
| 5 | MEHQ | 0.0201 |

| | HEPTANE | THF | IPA | MAA | BHT | MEHQ |
|---|---|---|---|---|---|---|
| STD-1 | 66.441 | 33.875 | 28.533 | 28.222 | 54.747 | 32.643 |
| STD-2 | 66.139 | 33.923 | 28.318 | 27.711 | 54.686 | 35.663 |
| STD-3 | 66.529 | 34.366 | 29.157 | 27.212 | 56.565 | 33.533 |
| STD-4 | 65.676 | 33.979 | 28.818 | 27.631 | 56.005 | 37.052 |
| STD-5 | 64.806 | 33.774 | 28.489 | 27.215 | 55.321 | 31.885 |
| STD-6 | 64.033 | 33.563 | 28.329 | 26.93 | 55.382 | 34.797 |
| Average | 65.604 | 33.91333 | 28.60733 | 27.48683 | 55.451 | 34.262 |

TABLE 10-continued

RESIDUAL MONOMER REPORT
Product Poloxamer
Batch No. FS09903-070
A.R.No. A576683

| Std. Dev | 1.00 | 0.27 | 0.32 | 0.46 | 0.73 | 1.941 |
|---|---|---|---|---|---|---|
| % RSD | 1.52 | 0.78 | 1.14 | 1.68 | 1.31 | 5.66 |

| | AREA OF | | % RESIDUALS | |
|---|---|---|---|---|
| RESIDUALS | TS-1 | TS-2 | TS-1 | TS-2 |
| HEPTANE | N.D | N.D | N.D | N.D |
| THF | N.D | N.D | N.D | N.D |
| IPA | N.D | N.D | N.D | N.D |
| MAA | N.D | N.D | N.D | N.D |
| BHT | N.D | N.D | N.D | N.D |
| MEHQ | N.D | N.D | N.D | N.D |
| Total residuals | | | N.D | N.D |
| Average | | | N.D | |

*TS—Test sample
**N.D—Not detected
Weight of test sample-1 (g) = 0.1001
Weight of test sample-2 (g) = 0.1005

Figure 40:
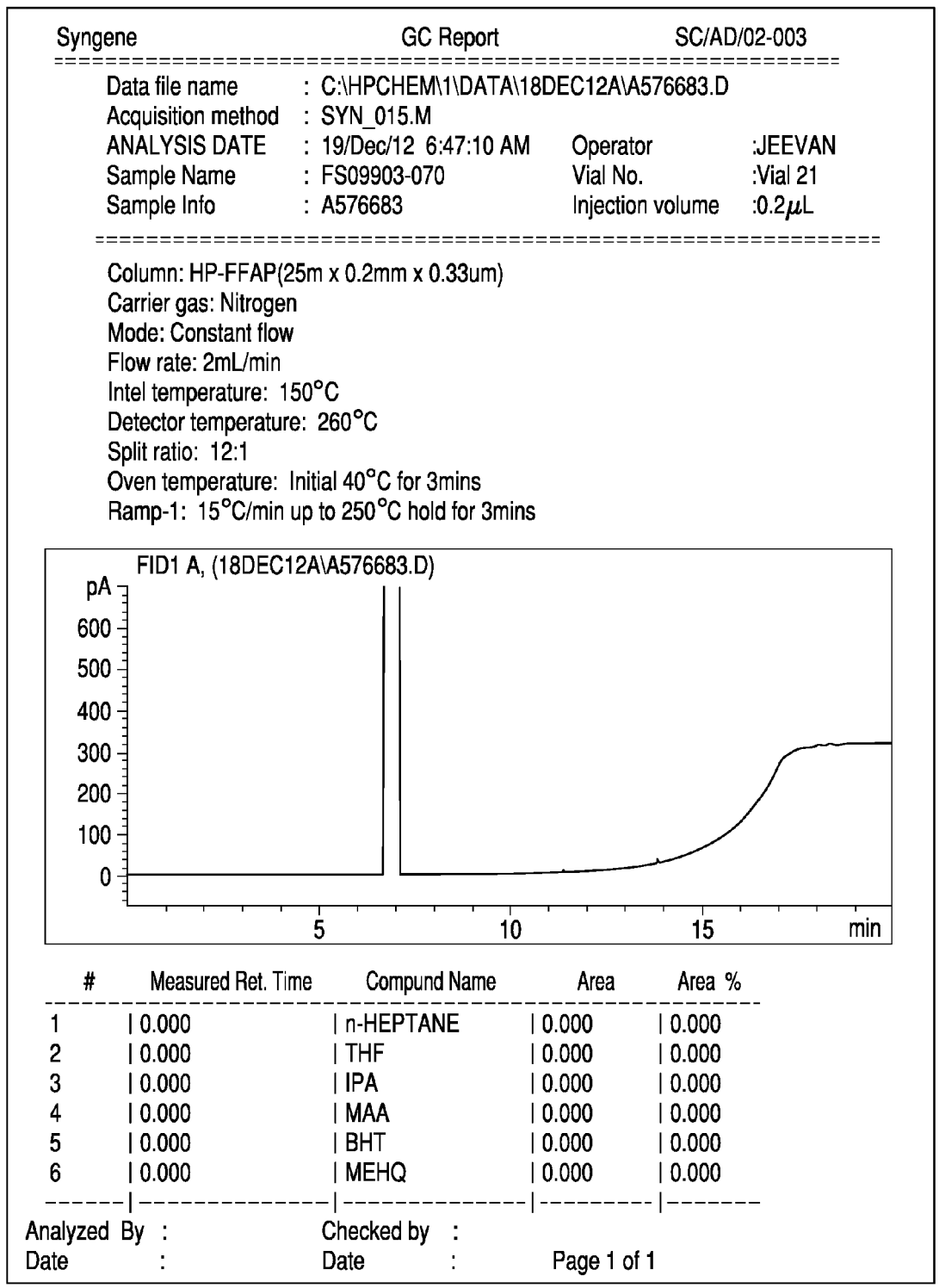
FIG. 40 is GC chromatogram of the batch FS-09903-070 when the reaction is performed using BHT and MEHQ as inhibitors for the optimized improved large scale synthesis of Poloxamer 407DM of Example 3. There are no detectable solvent residue, MAA, BHT and MEHQ in the final product.
Figure 41:
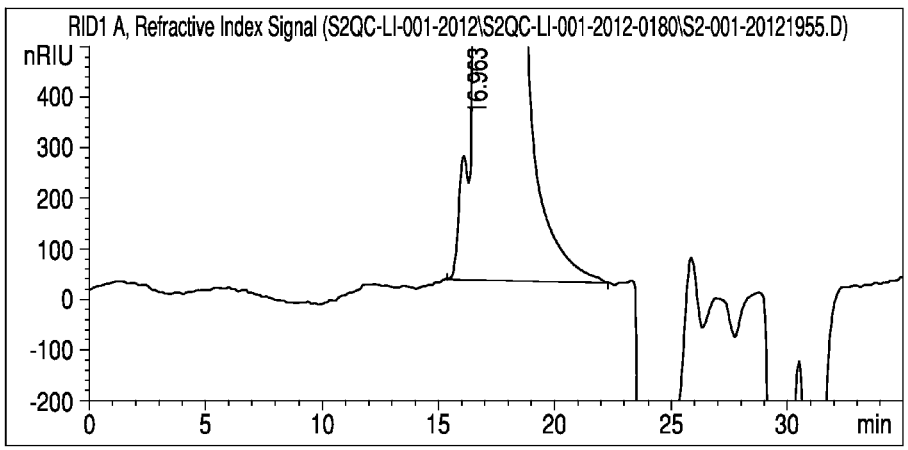
FIG. 41 is the HPLC chromatogram showing the high molecular weight component identification of the batch FS-09903-070 when the reaction is performed using BHT and MEHQ as inhibitors for the optimized improved large scale synthesis of Poloxamer 407DM of Example 3.

GC Calculation (FIG. 40):

High Molecular Component was Identified Using HPLC System:

Chromatogram is given below. It is found that HMW component is not detected in this sample (FIG. 41).

Figure 43:
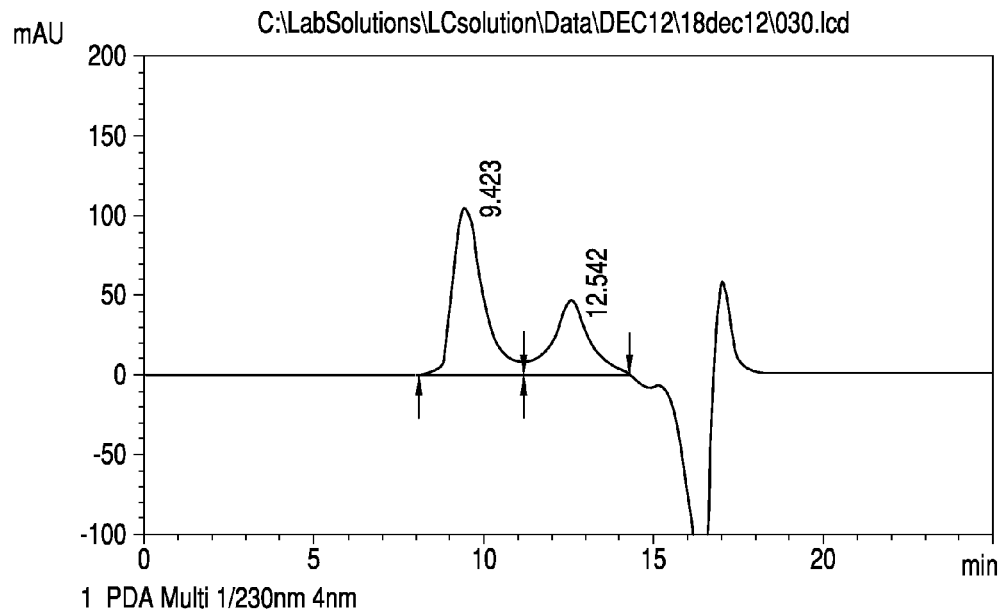

GPC:

GPC was performed using Agilent 1200 Series with Addon GPC software. PEG-PPg was used as the GPC standards (FIG. 42 and FIG. 43).

Turbidity measurement of the Poloxamer 407 DM was measured in NTU units using HF Scientific Turbidity meter (Make): Model-Micro 100 Turbid meter. Solution was prepared in 10% water and THF. The turbidity in water showed 5 NTU and in THF 4 NTU.

Methacrylic Acid Content:

Titration method was followed. The Methacrylic acid content: 0.001% (for this sample).

Comparative Example 3

Prior Art Synthesis of Functionalized Surfactants 6.00 g of PLURONIC F127 was placed in a round bottom flask and dried thoroughly via azeotropic distillation of toluene (100 ml). The round bottom flask was then fitted with a reflux condenser and the reaction was blanketed with Nitrogen gas. Anhydrous tetrahydrofuran (THF) (60 ml) was added to the flask and the reaction was chilled to 5° C. with 15 equivalents (based upon the hydroxyl end groups) of triethylamine (TEA) was added (2.0 ml). 1.4 ml of methacryloyl chloride (15 equivalents) was dropped into the reaction mixture through an addition funnel and the reaction mixture was allowed to warm to room temperature and then stirred overnight. The reaction mixture was then heated to 65° C. for 3 hours. Precipitated salt (TEA-HCl) was filtered from the reaction mixture and the filtrate was concentrated to a volume of around 355 mL and precipitated into cold heptane. Two further precipitations were performed to reduce the amount of TEA-HCl salt to less than 0.2% by weight. NMR analysis of the final polymer showed greater than 90% conversion of the hydroxyl end groups to the methacrylated end groups.

Example 4

100 g of PLURONIC F-108 was placed in a round bottom flask fitted with reflex condenser and the reaction was blanketed with nitrogen gas Anhydrous tetrahydrofuran (THF; 700 mL) stabilized with 1050 mg of 2,6 di tert-butyl 4 methyl phenol (BHT) was added to the flask and heated to 30° C. under stirring till it formed a clear solution. 11.5 mL of triethylamine (TEA) was added to the above solution and the stirring continued. To this was added drop wise 8.01 mL of freshly distilled methacryloyl chloride which was stabilized with 24 mg of Hydroquinone monomethyl ether (MEHQ) at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove 233 mL of THF to get 467 mL of mass. The mass was precipitated into 3200 mL of n-heptane. The precipitate was filtered and dried at 45° C. under high vacuum.

Example 5

100 g of PLURONIC F-108 was placed in a round bottom flask fitted with reflex condenser and the reaction was blanketed with nitrogen gas Anhydrous tetrahydrofuran (THF; 700 mL) stabilized with 1050 mg of hydroquinone (HQ) was added to the flask and heated to 30° C. under stirring till it formed a clear solution. 11.5 mL of triethylamine (TEA) was added to the above solution and the stirring continued. To this was added drop wise 8.01 mL of freshly distilled methacryloyl chloride which was stabilized with 24 mg of Hydroquinone monomethyl ether (MEHQ) at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove 233 mL of THF to get 467 mL of mass. The mass was precipitated into 3200 mL of n-heptane. The precipitate was filtered and dried at 45° C. under high vacuum.

Example 6

100 g of PLURONIC F-127 was placed in a round bottom flask fitted with reflex condenser and the reaction was blanketed with nitrogen gas Anhydrous tetrahydrofuran (THF; 700 mL) stabilized with 1050 mg of phenothiazine (PTZ) was added to the flask and heated to 30° C. under stirring till it formed a clear solution. 13.6 mL of triethylamine (TEA) was added to the above solution and the stirring continued. To this was added drop wise 9.5 mL of freshly distilled methacryloyl chloride which was stabilized with 28.5 mg of Hydroquinone monomethyl ether (MEHQ) at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove 233 mL of THF to get 467 mL of mass. The mass was precipitated into 3200 mL of n-heptane. The precipitate was filtered and dried at 45° C. under high vacuum.

Example 7

100 g of PLURONIC F-68 was placed in a round bottom flask fitted with reflex condenser and the reaction was blanketed with nitrogen gas Anhydrous tetrahydrofuran (THF; 700 mL) stabilized with 1050 mg of 2,6 di tert-butyl 4 methyl phenol (BHT) was added to the flask and heated to 30° C. under stirring till it formed a clear solution. 19.78 mL of triethylamine (TEA) was added to the above solution and the stirring continued. To this was added drop wise 13.95 mL of freshly distilled methacryloyl chloride which was stabilized with 41.8 mg of Hydroquinone monomethyl ether (MEHQ) at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove 233 mL of THF to get 467 mL of mass. The mass was precipitated into 3200 mL of n-heptane. The precipitate was filtered and dried at 45° C. under high vacuum.

Example 8

100 g of PLURONIC P-105 was placed in a round bottom flask fitted with reflex condenser and the reaction was blanketed with nitrogen gas Anhydrous tetrahydrofuran (THF; 700 mL) stabilized with 1050 mg of 2,6 di tert-butyl 4 methyl phenol (BHT) was added to the flask and heated to 30° C. under stirring till it formed a clear solution. 25.73 mL of triethylamine (TEA) was added to the above solution and the stirring continued. To this was added drop wise 18 mL of freshly distilled methacryloyl chloride which was stabilized with 54 mg of Hydroquinone monomethyl ether (MEHQ) at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove 233 mL of THF to get 467 mL of mass. The mass was precipitated into 3200 mL of n-heptane. The precipitate was filtered and dried at 45° C. under high vacuum.

Example 9

100 g of PLURONIC F-108 was placed in a round bottom flask fitted with reflex condenser and the reaction was blanketed with nitrogen gas Anhydrous tetrahydrofuran (THF; 700 mL) stabilized with 1050 mg of phenothiazine (PTZ) was added to the flask and heated to 30° C. under stirring till it formed a clear solution. 11.5 mL of triethylamine (TEA) was added to the above solution and the stirring continued. To this was added drop wise 8.01 mL of freshly distilled methacryloyl chloride which was stabilized with 24 mg of Hydroquinone monomethyl ether (MEHQ) at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove 233 mL of THF to get 467 mL of mass. The mass was precipitated into 3200 mL of n-heptane. The precipitate was filtered and dried at 45° C. under high vacuum.

Example 10

100 g of PLURONIC L-101 was placed in a round bottom flask fitted with reflex condenser and the reaction was blanketed with nitrogen gas Anhydrous tetrahydrofuran (THF; 700 mL) stabilized with 1050 mg of 2,6 di tert-butyl 4 methyl phenol (BHT) was added to the flask and heated to 30° C. under stirring till it formed a clear solution. 43.9 mL of triethylamine (TEA) was added to the above solution and the stirring continued. To this was added drop wise 30.84 mL of freshly distilled methacryloyl chloride which was stabilized with 92.5 mg of Hydroquinone monomethyl ether (MEHQ) at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove 233 mL of THF to get 467 mL of mass. The mass was precipitated into 3200 mL of n-heptane. The precipitate was filtered and dried at 45° C. under high vacuum.

Example 11

100 g of PLURONIC F-108 was placed in a round bottom flask fitted with reflex condenser and the reaction was blanketed with nitrogen gas Anhydrous tetrahydrofuran (THF; 700 mL) stabilized with 1050 mg of phenothiazine (PTZ) was added to the flask and heated to 30° C. under stirring till it formed a clear solution. 11.5 mL of triethylamine (TEA) was added to the above solution and the stirring continued. To this was added drop wise 8.01 mL of freshly distilled methacryloyl chloride which was stabilized with 24 mg of hydroquinone (HQ) at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove 233 mL of THF to get 467 mL of mass. The mass was precipitated into 3200 mL of n-heptane. The precipitate was filtered and dried at 45° C. under high vacuum.

Example 12

100 g of PLURONIC F-127 was placed in a round bottom flask fitted with reflex condenser and the reaction was blanketed with nitrogen gas Anhydrous tetrahydrofuran (THF; 700 mL) stabilized with 1050 mg of 2,6 di tert-butyl 4 methyl phenol (BHT) was added to the flask and heated to 30° C. under stirring till it formed a clear solution. 13.6 mL of triethylamine (TEA) was added to the above solution and the stirring continued. To this was added drop wise 9.5 mL of freshly distilled methacryloyl chloride which was stabilized with 28.5 mg of hydroquinone (HQ) at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove 233 mL of THF to get 467 mL of mass. The mass was precipitated into 3200 mL of n-heptane. The precipitate was filtered and dried at 45° C. under high vacuum.

Example 13

100 g of PLURONIC F-127 was placed in a round bottom flask fitted with reflex condenser and the reaction was blanketed with nitrogen gas Anhydrous tetrahydrofuran (THF; 700 mL) stabilized with 1050 mg of phenothiazine (PTZ) was added to the flask and heated to 30° C. under stirring till it formed a clear solution. 13.6 mL of triethylamine (TEA) was added to the above solution and the stirring continued. To this was added drop wise 9.5 mL of freshly distilled methacryloyl chloride which was stabilized with 28.5 mg of hydroquinone (HQ) at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove 233 mL of THF to get 467 mL of mass. The mass was precipitated into 3200 mL of n-heptane. The precipitate was filtered and dried at 45° C. under high vacuum.

Example 14

100 g of PLURONIC F-38 was placed in a round bottom flask fitted with reflex condenser and the reaction was blanketed with nitrogen gas Anhydrous tetrahydrofuran (THF; 700 mL) stabilized with 1050 mg of 2,6 di tert-butyl 4 methyl phenol (BHT) was added to the flask and heated to 30° C. under stirring till it formed a clear solution. 35.54 mL of triethylamine (TEA) was added to the above solution and the stirring continued. To this was added drop wise 24.93 mL of freshly distilled methacryloyl chloride which was stabilized with 74.8 mg of Hydroquinone monomethyl ether (MEHQ) at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove 233 mL of THF to get 467 mL of mass. The mass was precipitated into 3200 mL of n-heptane. The precipitate was filtered and dried at 45° C. under high vacuum.

Example 15

100 g of PLURONIC F-127 was placed in a round bottom flask fitted with reflex condenser and the reaction was blanketed with nitrogen gas Anhydrous tetrahydrofuran (THF; 700 mL) stabilized with 1050 mg of hydroquinone (HQ) was added to the flask and heated to 30° C. under stirring till it formed a clear solution. 13.6 mL of triethylamine (TEA) was added to the above solution and the stirring continued. To this was added drop wise 9.5 mL of freshly distilled methacryloyl chloride which was stabilized with 28.5 mg of Hydroquinone monomethyl ether (MEHQ) at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove 233 mL of THF to get 467 mL of mass. The mass was precipitated into 3200 mL of n-heptane. The precipitate was filtered and dried at 45° C. under high vacuum.

Example 16

100 g of PLURONIC F-108 was placed in a round bottom flask fitted with reflex condenser and the reaction was blanketed with nitrogen gas Anhydrous tetrahydrofuran (THF; 700 mL) stabilized with 1050 mg of 2,6 di tert-butyl 4 methyl phenol (BHT) was added to the flask and heated to 30° C. under stirring till it formed a clear solution. 11.5 mL of triethylamine (TEA) was added to the above solution and the stirring continued. To this was added drop wise 8.01 mL of freshly distilled methacryloyl chloride which was stabilized with 24 mg of phenothiazine (PTZ) at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove 233 mL of THF to get 467 mL of mass. The mass was precipitated into 3200 mL of n-heptane. The precipitate was filtered and dried at 45° C. under high vacuum.

Example 17

100 g of PLURONIC F-108 was placed in a round bottom flask fitted with reflex condenser and the reaction was blanketed with nitrogen gas Anhydrous tetrahydrofuran (THF; 700 mL) stabilized with 1050 mg of 2,6 di tert-butyl 4 methyl phenol (BHT) was added to the flask and heated to 30° C. under stirring till it formed a clear solution. 11.5 mL of triethylamine (TEA) was added to the above solution and the stirring continued. To this was added drop wise 8.01 mL of freshly distilled methacryloyl chloride which was stabilized with 24 mg of hydroquinone (HQ) at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove 233 mL of THF to get 467 mL of mass. The mass was precipitated into 3200 mL of n-heptane. The precipitate was filtered and dried at 45° C. under high vacuum.

Example 18

100 g of PLURONIC F-127 was placed in a round bottom flask fitted with reflex condenser and the reaction was blanketed with nitrogen gas Anhydrous tetrahydrofuran (THF; 700 mL) stabilized with 1050 mg of 2,6 di tert-butyl 4 methyl phenol (BHT) was added to the flask and heated to 30° C. under stirring till it formed a clear solution. 13.6 mL of triethylamine (TEA) was added to the above solution and the stirring continued. To this was added drop wise 9.5 mL of freshly distilled methacryloyl chloride which was stabilized with 28.5 mg of phenothiazine (PTZ) at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove 233 mL of THF to get 467 mL of mass. The mass was precipitated into 3200 mL of n-heptane. The precipitate was filtered and dried at 45° C. under high vacuum.

Example 19

100 g of PLURONIC P-123 was placed in a round bottom flask fitted with reflex condenser and the reaction was blanketed with nitrogen gas Anhydrous tetrahydrofuran (THF; 700 mL) stabilized with 1050 mg of 2,6 di tert-butyl 4 methyl phenol (BHT) was added to the flask and heated to 30° C. under stirring till it formed a clear solution. 28.99 mL of triethylamine (TEA) was added to the above solution and the stirring continued. To this was added drop wise 20.78 mL of freshly distilled methacryloyl chloride which was stabilized with 61.14 mg of Hydroquinone monomethyl ether (MEHQ) at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove 233 mL of THF to get 467 mL of mass. The mass was precipitated into 3200 mL of n-heptane. The precipitate was filtered and dried at 45° C. under high vacuum Example 20

100 g of PLURONIC F-87 was placed in a round bottom flask fitted with reflex condenser and the reaction was blanketed with nitrogen gas Anhydrous tetrahydrofuran (THF; 700 mL) stabilized with 1050 mg of 2,6 di tert-butyl 4 methyl phenol (BHT) was added to the flask and heated to 30° C. under stirring till it formed a clear solution. 21.57 mL of triethylamine (TEA) was added to the above solution and the stirring continued. To this was added drop wise 15.21 mL of freshly distilled methacryloyl chloride which was stabilized with 45.6 mg of Hydroquinone monomethyl ether (MEHQ) at 30-32° C. through an addition funnel. The reaction mixture was heated to 63° C. upon stirring with nitrogen gas for 3 hours. Then the reaction mass was cooled for 12 h at RT.

Work Up:

The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove 233 mL of THF to get 467 mL of mass. The mass was precipitated into 3200 mL of n-heptane. The precipitate was filtered and dried at 45° C. under high vacuum.

Example 21

100 g of Tetronic 1107 (Poloxamine) was placed in a round bottom flask fitted with reflex condenser and the reaction was blanketed with nitrogen gas Anhydrous tetrahydrofuran (THF; 700 mL) stabilized with 1050 mg of 2,6 ditert-butyl-4-methyl phenol (BHT) was added to the flask and heated to 30° C. under stirring till it formed a clear solution. 11.21 mL of triethylamine (TEA) was added to the above solution and the stirring continued. To this was added drop wise 7.81 mL of freshly distilled methacryloyl chloride which was stabilized with 23.42 mg of Hydroquinone monomethyl ether (MEHQ) at 30-32° C. through an addition funnel. The reaction mixture was heated to 63° C. upon stirring with nitrogen gas for 3 hours. Then the reaction mass was cooled for 12 h at RT.

Work Up: The Precipitated salt (TEA-HCl) was filtered from the reaction mixture and the filtrate was treated with 50 g of Basic alumina under stirring for 30 minutes and filtered. The filtrate was treated with 50 g of basic resin (PUROLITE) under stirring for 30 minutes and filtered through celite bed. The filtrate was concentrated to remove 233 mL of THF to get 467 mL of mass. The mass was precipitated into 3200 mL of n-heptane. The precipitate was filtered and dried at 45° C. under high vacuum.

What is claimed is:

1. A method comprising reacting a poloxamer or poloxamine compound with a first methacrylating agent in the presence of a solvent stabilized with a first free radical inhibitor to form a first reaction product, and further reacting the first reaction product with an organic base and a second methacrylating agent stabilized with a second free radical inhibitor to form a second reaction product, wherein the second free radical inhibitor is hydroquinone monomethyl ether (MEHQ), and wherein the first free radical inhibitor is a different compound than the second free radical inhibitor.

2. The method of claim 1 wherein the first and second methacrylating agents are the same.

3. The method of claim 2 wherein the methacrylating agent is methacryloyl chloride.

4. The method of claim 3 wherein the first free radical inhibitor is 2,6 di tert-butyl-4-methyl phenol (BHT).

5. The method of claim 4 wherein the organic base is triethylamine (TEA).

6. The method of claim 1 wherein the first free radical inhibitor is 2,6 ditert-butyl-4-methyl phenol (BHT).

7. The method of claim 1 wherein the organic base is triethylamine (TEA).

8. The method of claim 1 wherein the poloxamer or poloxamine compound is a poloxamer compound, wherein the first reaction product is a monomethacrylated poloxamer compound and wherein the second reaction product is a dimethacrylated poloxamer compound.

9. The method of claim 5 wherein the poloxamer or poloxamine compound is reacted with the first methacrylating agent in the presence of the organic base.

10. The method of claim 1 wherein the poloxamer or poloxamine compound is a poloxamine compound, wherein the first reaction product is a monomethacrylated poloxamine compound and wherein the second reaction product is a polymethacrylated poloxamine compound.

11. The method of claim 10 wherein the first and second methacrylating agents are methacryloyl chloride, and the first free radical inhibitor is 2,6 di tert-butyl-4-methyl phenol (BHT).

12. The method of claim 11 wherein the organic base is triethylamine (TEA).

13. The method of claim 12 wherein the poloxamine compound is reacted with the first methacrylating agent in the presence of the organic base.

14. The method of claim 1 wherein the poloxamer or poloxamine compound is reacted with the first methacrylating agent in the presence of the organic base.

15. A method comprising reacting a monomethacrylated poloxamer or monomethacrylated poloxamine compound with an organic base and a methacrylating agent stabilized with a hydroquinone monomethyl ether (MEHQ) free radical inhibitor to form a dimethacrylated poloxamer compound or a polymethacrylated poloxamine compound.

16. The method of claim 15, wherein the monomethacrylated poloxamer compound is reacted with an organic base and a methacrylating agent stabilized with a hydroquinone monomethyl ether (MEHQ) free radical inhibitor to form a dimethacrylated poloxamer compound.

17. The method of claim 15, wherein the monomethacrylated poloxamine compound is reacted with an organic base and a methacrylating agent stabilized with a hydroquinone monomethyl ether (MEHQ) free radical inhibitor to form a polymethacrylated poloxamine compound.

18. A reaction mixture comprising a monomethacrylated poloxamer or monomethacrylated poloxamine compound, an organic base, a methacrylating agent, and a hydroquinone monomethyl ether (MEHQ) free radical inhibitor.

19. The reaction mixture of claim 18, wherein the monomethacrylated poloxamer or monomethacrylated poloxamine compound comprises a monomethacrylated poloxamer compound.

20. The reaction mixture of claim 18, wherein the monomethacrylated poloxamer or monomethacrylated poloxamine compound comprises a monomethacrylated poloxamine compound.

* * * * *